United States Patent
Shaked et al.

(10) Patent No.: US 12,438,623 B2
(45) Date of Patent: *Oct. 7, 2025

(54) FREQUENCY DEPENDENT RESIDUAL SIDE BAND TRAINING SIGNALS

(71) Applicant: QUALCOMM Incorporated, San Diego, CA (US)

(72) Inventors: Ronen Shaked, Kfar Saba (IL); Gideon Shlomo Kutz, Ramat Hasharon (IL)

(73) Assignee: Qualcomm Incorporated, San Diego, CA (US)

( * ) Notice: Subject to any disclaimer, the term of this patent is extended or adjusted under 35 U.S.C. 154(b) by 393 days.

This patent is subject to a terminal disclaimer.

(21) Appl. No.: 18/069,735

(22) Filed: Dec. 21, 2022

(65) Prior Publication Data

US 2024/0214083 A1   Jun. 27, 2024

(51) Int. Cl.
   *H04B 17/21*   (2015.01)
   *H04B 1/68*    (2006.01)
   *H04L 25/03*   (2006.01)

(52) U.S. Cl.
   CPC ............ *H04B 17/21* (2015.01); *H04B 1/68* (2013.01); *H04L 25/03159* (2013.01)

(58) Field of Classification Search
   CPC ........ H04B 17/21; H04B 1/68; H04B 1/0071; H04B 7/06956; H04L 25/03159; H04L 2025/03815; H04L 25/03; H04L 27/04; H04L 27/38; H04L 7/0079; H04L 5/0098; H04L 5/0048; H04L 27/02; H04L 7/0091; H04L 5/0053; H04L 27/364; H04L 27/368; H04L 25/03006
   See application file for complete search history.

(56) References Cited

U.S. PATENT DOCUMENTS

| | | | | |
|---|---|---|---|---|
| 7,783,293 | B2 * | 8/2010 | Tujkovic | H04B 7/069 370/332 |
| 8,280,314 | B2 * | 10/2012 | Heutmaker | H04B 1/30 455/305 |
| 9,397,802 | B2 * | 7/2016 | Zhang | H04L 5/009 |
| 11,924,009 | B1 * | 3/2024 | Shaked | H04L 27/264 |
| 2010/0330929 | A1 * | 12/2010 | Heutmaker | H04B 1/00 455/73 |
| 2016/0072564 | A1 * | 3/2016 | Li | H04B 7/06 |
| 2018/0294900 | A1 * | 10/2018 | Zhang | H04B 17/21 |
| 2024/0214155 | A1 * | 6/2024 | Shaked | H04B 1/68 |

FOREIGN PATENT DOCUMENTS

| | | | | |
|---|---|---|---|---|
| WO | WO-2017136706 | A1 * | 8/2017 | H04L 5/0082 |
| WO | WO-2021066696 | A1 * | 4/2021 | H04B 7/00 |

* cited by examiner

*Primary Examiner* — Lana N Le
(74) *Attorney, Agent, or Firm* — Harrity & Harrity, LLP

(57) ABSTRACT

Various aspects of the present disclosure generally relate to wireless communication. In some aspects, a user equipment (UE) may receive a frequency dependent residual side band (FDRSB) training signal via one or more time resources. The UE may transmit an indication of network node FDRSB correction information that is based at least in part on the FDRSB training signal. The UE may receive a communication, reception of the communication comprising applying a UE FDRSB correction that is based at least in part on the FDRSB training signal. Numerous other aspects are described.

29 Claims, 15 Drawing Sheets

FREQUENCY DEPENDENT RESIDUAL SIDE BAND TRAINING SIGNALS

FIELD OF THE DISCLOSURE

Aspects of the present disclosure generally relate to wireless communication and to techniques and apparatuses for frequency dependent residual side band (FDRSB) training signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a frequency dependent residual side band (FDRSB) training signal via one or more time resources. The method may include transmitting an indication of network node FDRSB correction information that is based at least in part on the FDRSB training signal. The method may include receiving a communication, reception of the communication comprising applying a UE FDRSB correction that is based at least in part on the FDRSB training signal.

Some aspects described herein relate to a method of wireless communication performed by a UE. The method may include receiving a multi-port FDRSB training signal with the FDRSB signal transmitted via different ports on interleaved subcarriers, reception of the FDRSB comprising receiving the FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers. The method may include transmitting an indication of FDRSB correction that is based at least in part on the FDRSB training signal.

Some aspects described herein relate to a method of wireless communication performed by a network node. The method may include transmitting a multi-port FDRSB training signal with the FDRSB signal transmitted via different ports on interleaved subcarriers, transmission of the FDRSB comprising transmitting the FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers. The method may include receiving an indication of FDRSB correction that is based at least in part on the FDRSB training signal.

Some aspects described herein relate to a UE for wireless communication. The user equipment may include a memory and one or more processors coupled to the memory. The one or more processors may be configured to receive an FDRSB training signal via one or more time resources. The one or more processors may be configured to transmit an indication of network node FDRSB correction information that is based at least in part on the FDRSB training signal. The one or more processors may be configured to receive a communication, reception of the communication comprising applying a UE FDRSB correction that is based at least in part on the FDRSB training signal.

Some aspects described herein relate to a UE for wireless communication. The UE may include a memory and one or more processors coupled to the memory. The one or more processors may be configured to receive a multi-port FDRSB training signal with the FDRSB signal transmitted via different ports on interleaved subcarriers, reception of the FDRSB comprising receiving the FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers. The one or more processors may be configured to transmit an indication of FDRSB correction that is based at least in part on the FDRSB training signal.

Some aspects described herein relate to a network node for wireless communication. The network node may include a memory and one or more processors coupled to the memory. The one or more processors may be configured to transmit a multi-port FDRSB training signal with the FDRSB signal transmitted via different ports on interleaved subcarriers, transmission of the FDRSB comprising transmitting the FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers. The one or more processors may be configured to receive an indication of FDRSB correction that is based at least in part on the FDRSB training signal.

Some aspects described herein relate to a non-transitory computer-readable medium that stores a set of instructions for wireless communication by a UE. The set of instructions, when executed by one or more processors of the UE, may cause the UE to receive an FDRSB training signal via one or more time resources. The set of instructions, when executed by one or more processors of the UE, may cause the UE to transmit an indication of network node FDRSB correction information that is based at least in part on the FDRSB training signal. The set of instructions, when executed by one or more processors of the UE, may cause the UE to receive a communication, reception of the communication comprising applying a UE FDRSB correction that is based at least in part on the FDRSB training signal.

Some aspects described herein relate to a non-transitory computer-readable medium that stores a set of instructions for wireless communication. The set of instructions, when executed by one or more processors of a UE, may cause the UE to receive a multi-port FDRSB training signal with the FDRSB signal transmitted via different ports on interleaved subcarriers, reception of the FDRSB comprising receiving the FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers. The set of instructions, when executed by one or more processors of the UE, may cause the UE to transmit an indication of FDRSB correction that is based at least in part on the FDRSB training signal.

Some aspects described herein relate to a non-transitory computer-readable medium that stores a set of instructions for wireless communication by a network node. The set of instructions, when executed by one or more processors of the network node, may cause the network node to transmit a multi-port FDRSB training signal with the FDRSB signal transmitted via different ports on interleaved subcarriers, transmission of the FDRSB comprising transmitting the FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers. The set of instructions, when executed by one or more processors of the network node, may cause the network node to receive an indication of FDRSB correction that is based at least in part on the FDRSB training signal.

Some aspects described herein relate to an apparatus for wireless communication. The apparatus may include means for receiving an FDRSB training signal via one or more time resources. The apparatus may include means for transmitting an indication of network node FDRSB correction information that is based at least in part on the FDRSB training signal. The apparatus may include means for receiving a communication, reception of the communication comprising applying an apparatus FDRSB correction that is based at least in part on the FDRSB training signal.

Some aspects described herein relate to an apparatus for wireless communication. The apparatus may include means for receiving a multi-port FDRSB training signal with the FDRSB signal transmitted via different ports on interleaved subcarriers, reception of the FDRSB comprising receiving the FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers. The apparatus may include means for transmitting an indication of FDRSB correction that is based at least in part on the FDRSB training signal.

Some aspects described herein relate to an apparatus for wireless communication. The apparatus may include means for transmitting a multi-port FDRSB training signal with the FDRSB signal transmitted via different ports on interleaved subcarriers, transmission of the FDRSB comprising transmitting the FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers. The apparatus may include means for receiving an indication of FDRSB correction that is based at least in part on the FDRSB training signal.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
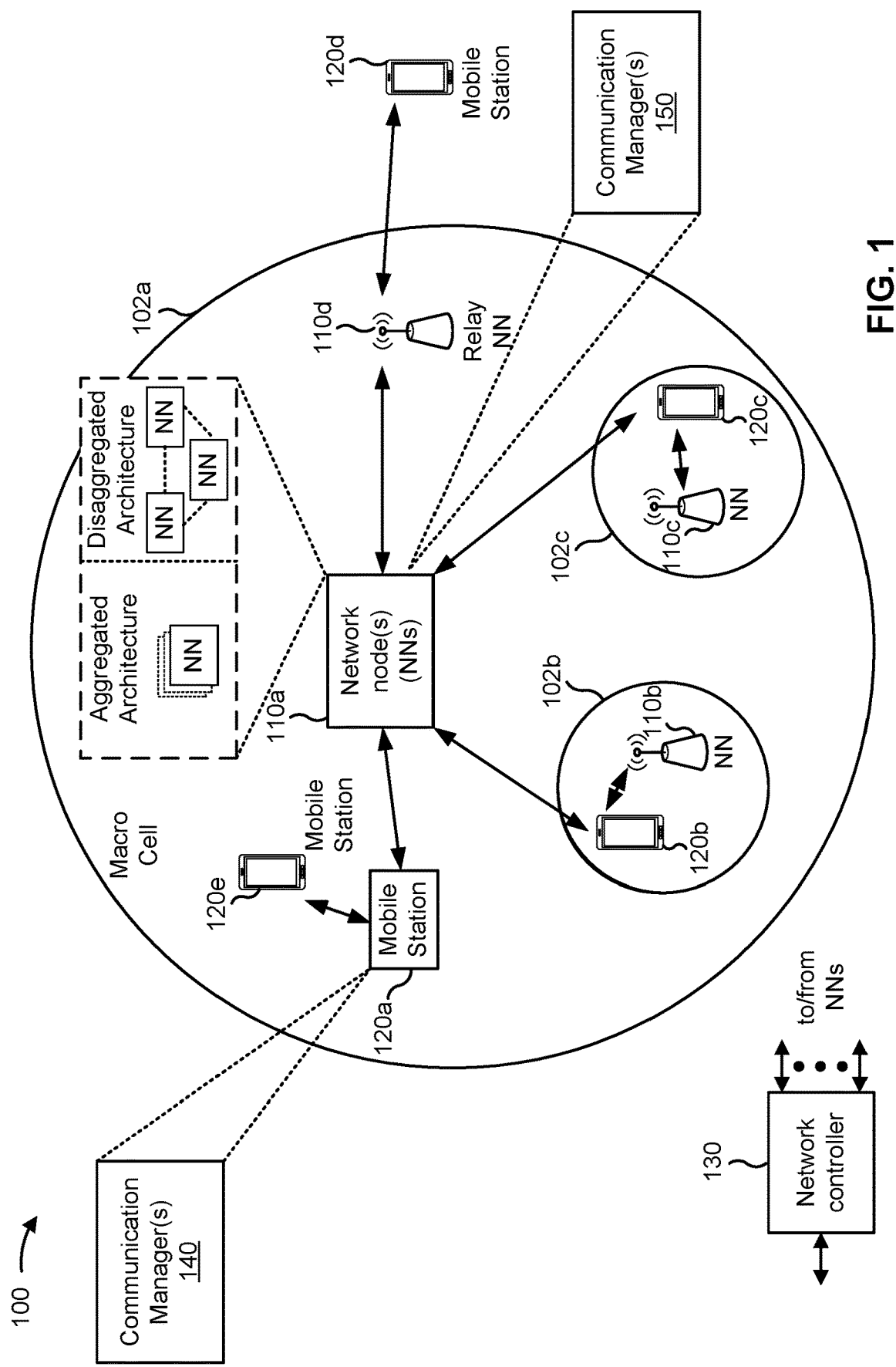
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a frequency dependent residual side band (FDRSB) training signal via one or more time resources; transmit an indication of network node FDRSB correction information that is based at least in part on the FDRSB training signal; and receive a communication, reception of the communication comprising applying a UE FDRSB correction that is based at least in part on the FDRSB training signal. Additionally, or alternatively, the communication manager 140 may perform one or more other operations described herein.

In some aspects, the communication manager 140 may receive a multi-port FDRSB training signal with the FDRSB signal transmitted via different ports on interleaved subcarriers, reception of the FDRSB comprising receiving the FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers; and transmit an indication of FDRSB correction that is based at least in part on the FDRSB training signal. Additionally, or alternatively, the communication manager 140 may perform one or more other operations described herein.

In some aspects, the network node 110 may include a communication manager 150. As described in more detail elsewhere herein, the communication manager 150 may transmit a multi-port FDRSB training signal with the FDRSB signal transmitted via different ports on interleaved subcarriers, transmission of the FDRSB comprising transmitting the FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers; and receive an indication of FDRSB correction that is based at least in part on the FDRSB training signal. Additionally, or alternatively, the communication manager 150 may perform one or more other operations described herein.

As indicated above, FIG. 1 is provided as an example. Other examples may differ from what is described with regard to FIG. 1.

Figure 2:
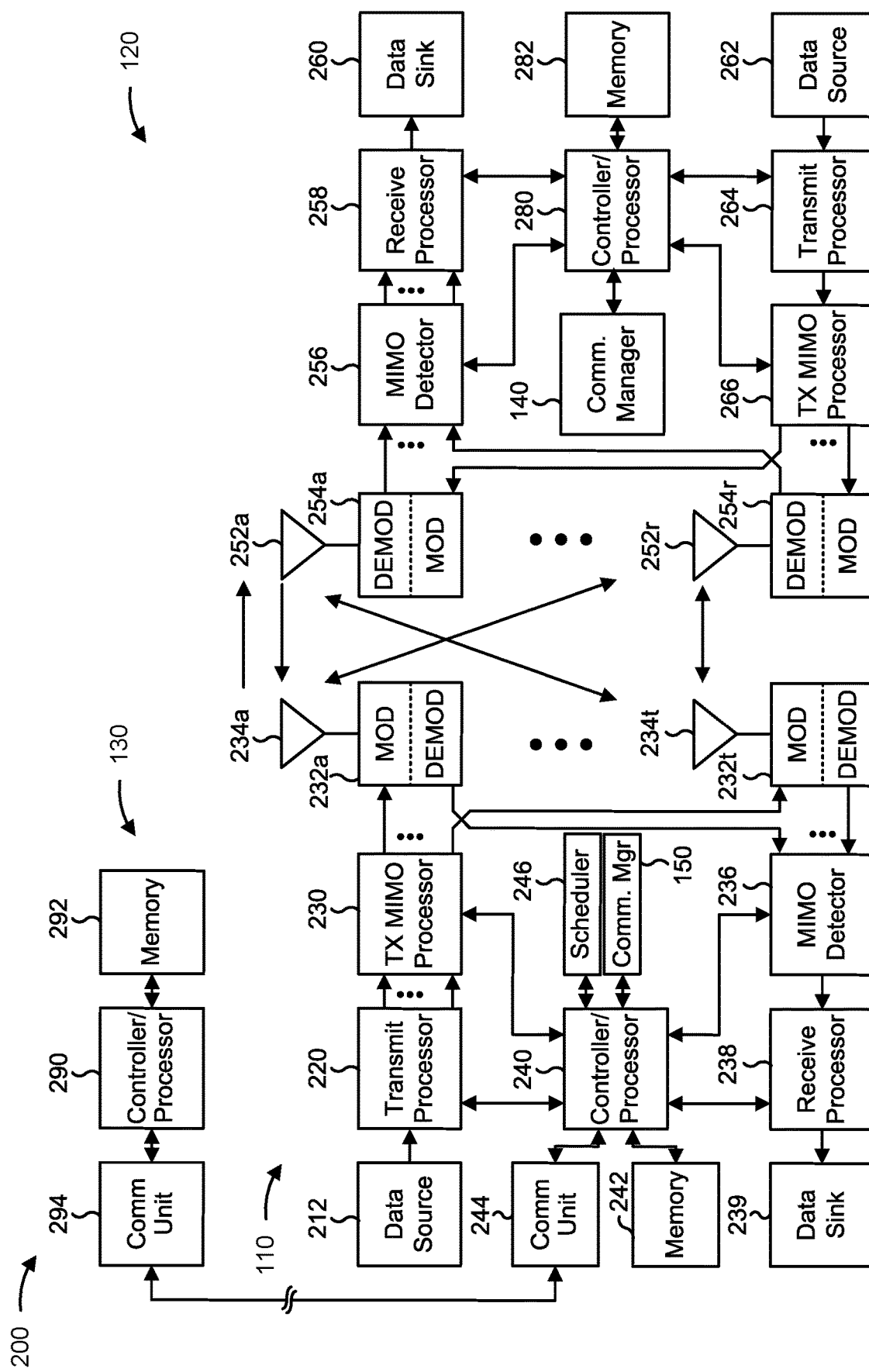
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-15).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-15).

The controller/processor 240 of the network node 110, the controller/processor 280 of the UE 120, and/or any other component(s) of FIG. 2 may perform one or more techniques associated with FDRSB training signals, as described in more detail elsewhere herein. For example, the controller/processor 240 of the network node 110, the controller/processor 280 of the UE 120, and/or any other component(s) of FIG. 2 may perform or direct operations of, for example, process 1100 of FIG. 11, process 1200 of FIG. 12, process 1300 of FIG. 13, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example process 1100 of FIG. 11, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving an FDRSB training signal via one or more time resources; means for transmitting an indication of network node FDRSB correction information that is based at least in part on the FDRSB training signal; and/or means for receiving a communication, reception of the communication comprising applying a UE FDRSB correction that is based at least in part on the FDRSB training signal. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a UE (e.g., the UE 120) includes means for receiving a multi-port FDRSB training signal with the FDRSB signal transmitted via different ports on interleaved subcarriers, reception of the FDRSB comprising receiving the FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers; and/or means for transmitting an indication of FDRSB correction that is based at least in part on the FDRSB training signal. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting a multi-port FDRSB training signal with the FDRSB signal transmitted via different ports on interleaved subcarriers, transmission of the FDRSB comprising transmitting the FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers; and/or means for receiving an indication of FDRSB correction that is based at least in part on the FDRSB training signal. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
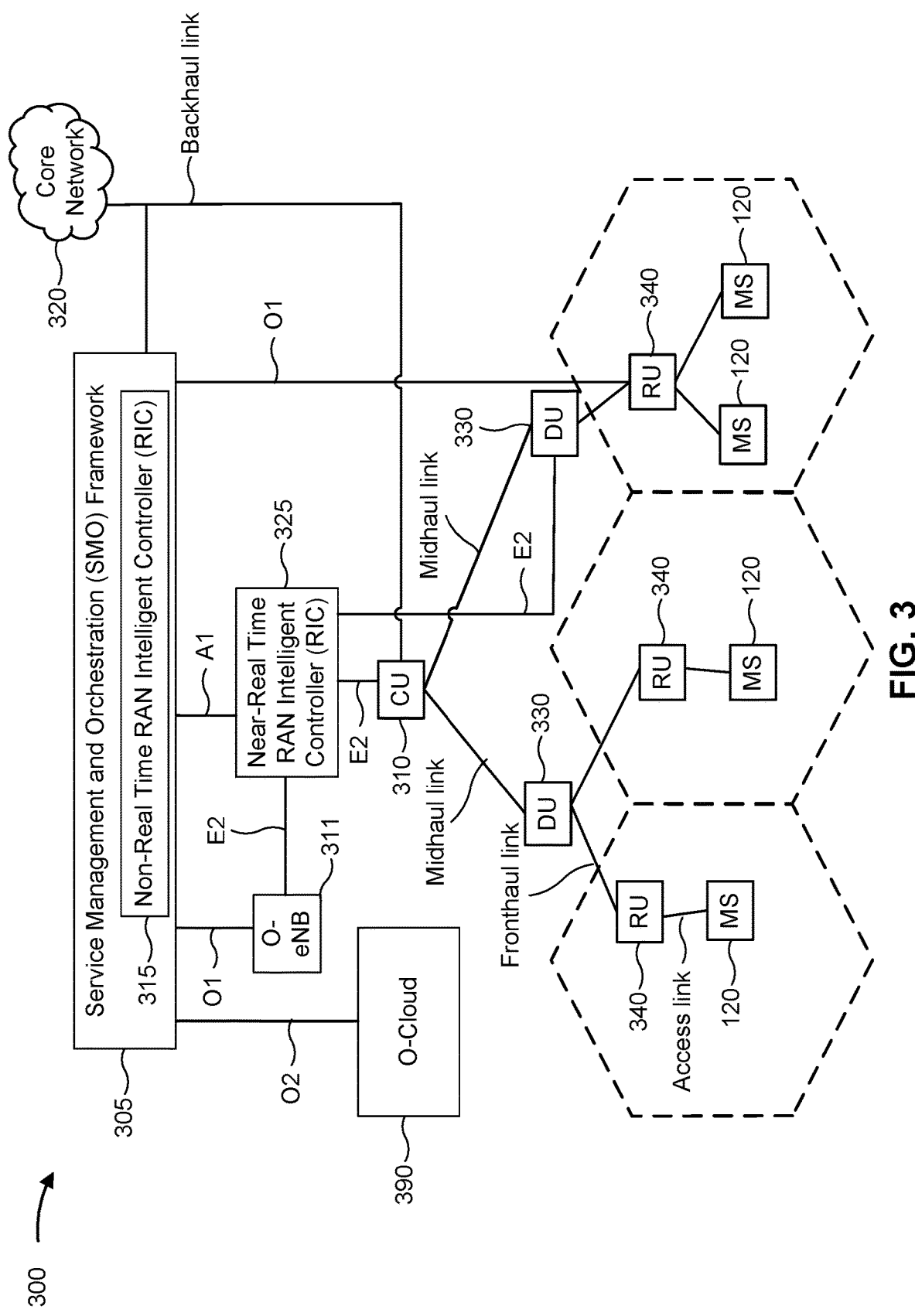
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
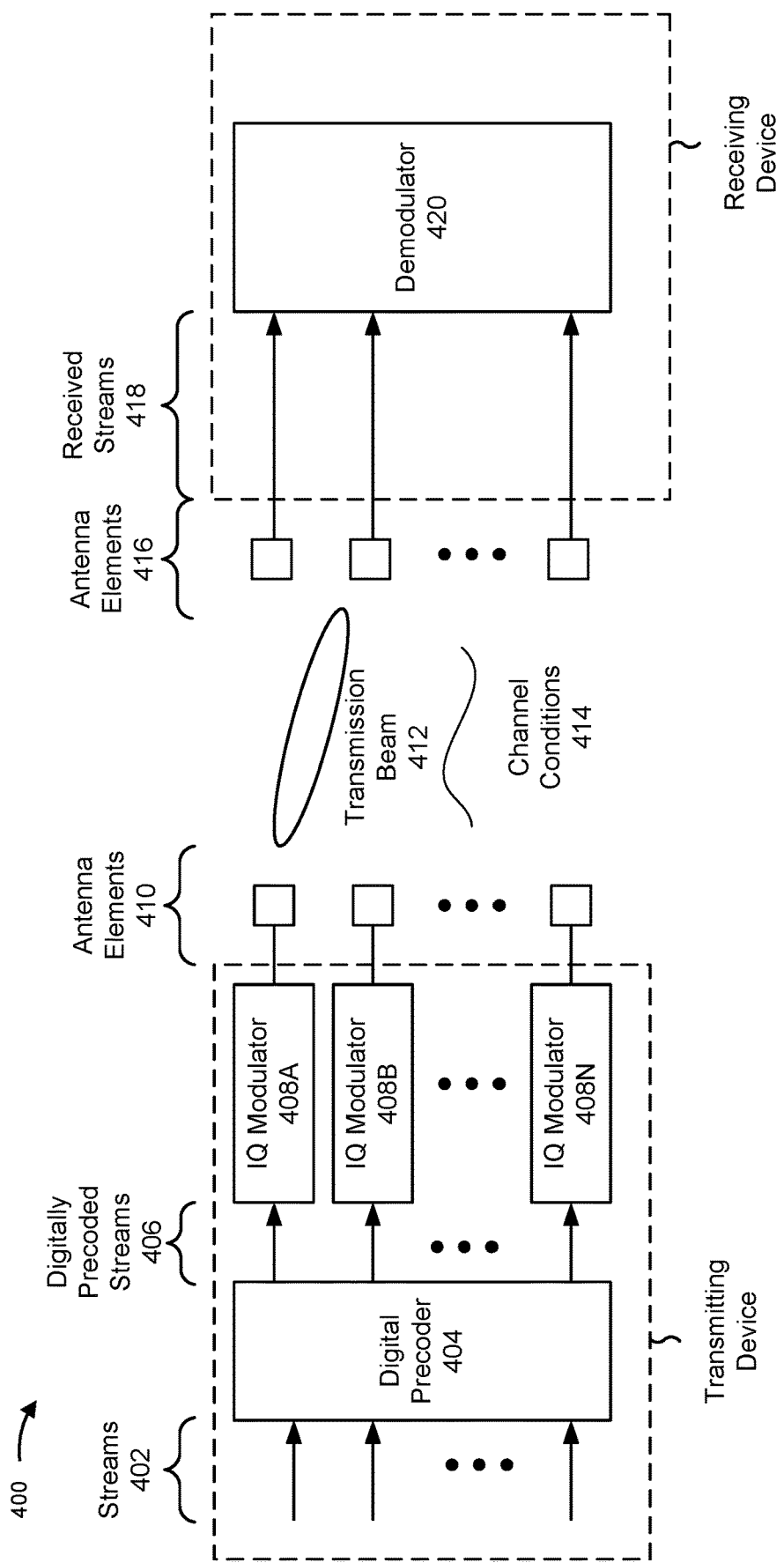
FIG. 4 is a diagram illustrating an example of a communication having FDRSB, in accordance with the present disclosure.

FIG. 4 is a diagram illustrating an example 400 of a communication having FDRSB, in accordance with the present disclosure. As shown in FIG. 4, a transmitting device may transmit a communication to a receiving device. The transmitting device may use multiple antenna elements (also referred to as "antennas") to transmit the communication using beamforming. The communication may include signals transmitted via multiple time-frequency resources (e.g., via multiple subcarriers and/or resource blocks on one or more symbols and/or slots).

As shown in FIG. 4, the transmitting device may receive multiple streams 402 for transmission to the receiving device. The streams may include data and/or control signaling for transmission to the receiving device. A digital precoder 404 may receive the streams 402 and apply precoding to the streams 402. After applying the precoding to the streams 402, the digital precoder 404 may output digitally precoded streams 406.

A set of IQ modulators 408 (e.g., IQ modulators 408A through 408N) may receive the digitally precoded streams 406 from the digital precoder 404 (e.g., directly or indirectly). The IQ modulators 408 may modulate the digitally precoded streams 406 to map bits of the digitally precoded streams 406 to constellation points associated with bit values of the digitally precoded streams 406. For example, the IQ modulators 408 may apply modulation based at least in part on applying amplitudes, in a Q (quadrature) dimension and an I (in-phase) dimension in an IQ plane, according to an MCS of communications to the receiving device. However, the IQ modulators 408 may cause FDRSB (e.g., an IQ mismatch, an FDRSB impairment, and/or FDRSB error) to the digital precoded streams 406 based at least in part on, for example, imperfections of the IQ modulators 408. This FDRSB may cause signaling on a first subcarrier to interfere with signaling on a second subcarrier that is a mirror of the first subcarrier about a carrier frequency. For example, the first subcarrier may be a distance from the carrier frequency in a positive direction (e.g., above the carrier frequency), and the second subcarrier may be the same distance from the carrier frequency in a negative direction (e.g., below the carrier frequency).

The IQ modulators 408 may provide modulated signals associated with the digitally precoded streams 406 to antenna elements 410 for transmission over the air to the receiving device. Based at least in part on digital precoding, the antenna elements 410 may transmit the modulated signals associated with the digitally precoded streams 406 via a transmission beam 412. In some examples, the antenna elements 410 may transmit the modulated signals via one or more transmission beams 412. As the modulated signals propagate over the air to the receiving device, channel conditions 414 may affect the modulated signals. For example, the channel conditions 414 may affect a signal-to-noise ratio (SNR) and/or a signal-to-interference-plus-noise ratio (SINR) of the modulated signals as received at the receiving device.

The receiving device may receive the modulated signals having effects from channel conditions 414. Additionally, based at least in part on transmission using the IQ modulators 408, the modulated signals may have FDRSB. The antenna elements 416 may provide received streams 418 (e.g., the modulated signals having effects of channel conditions 414 and FDRSB) to a demodulator 420. In some examples, the demodulator 420 may be unable to correctly demodulate the received streams 418 based at least in part on the FDRSB associated with the IQ modulators 408. In these examples, the receiving device and the transmitting device may consume power, processing, power, and/or communication resources to detect and correct demodulation errors or failures in the received streams 418. For example, the receiving device may provide hybrid automatic repeat request (HARQ) acknowledgment (HARQ-ACK) feedback to indicate a demodulation and/or decoding error, which may trigger a retransmission of communications associated with the streams 402.

As indicated above, FIG. 4 is provided as an example. Other examples may differ from what is described with regard to FIG. 4.

In some examples, IQ mismatch (also referred to as FDRSB) is an inherent impairment of an IQ modulator. Cancellation of this impairment may improve link performance by, for example, improving support for MCSs with improved spectral efficiency and/or reducing error rates of communications.

A network node may use multiple antenna groups (e.g., groups of one or more antenna elements), with the multiple antenna groups each connected to a different IQ modulator. The network node may not support estimation of transmission FDRSB (e.g., FDRSB of a signal transmitted by the UE) based at least in part on cost and complexity. For example, to support estimation of transmission FDRSB, the network node may use dedicated hardware including an RF feedback chain for each IQ modulator. The UE may sample transmitted signals using the RF feedback chain, apply an analog-to-digital conversion, and then perform FDRSB estimation and correction.

In some aspects described herein, a network node may transmit a training signal to a UE from which the UE may estimate FDRSB correction for a composite of all used transmission antenna groups and provide feedback (e.g., over-the-air (OTA)) to the network node. The network node may use the feedback to correct the FDRSB with reduced cost and complexity, relative to internal estimation of the FDRSB within the network node.

Based at least in part on using OTA FDRSB feedback and correction, the network node may correct a composite FDRSB, which may not be supported by a network node performing internal estimation of the FDRSB based at least in part on the network node not having knowledge of a channel transfer function as observed by the UE. Additionally, or alternatively, the UE may need calibration for reception FDRSB, which may be costly and complex to perform using internal estimation.

In some aspects described herein, a UE may support joint estimation (e.g., using a same FDRSB training signal to identify FDRSB correction for the UE and for a network node). In some aspects, the UE may identify a first component of FDRSB associated with the network node and a second component of FDRSB associated with the UE. In some aspects, the FDRSB training signal may occupy a bandwidth that includes a bandwidth on which the network node transmits communications to the UE. Additionally, or alternatively, the FDRSB training signal may support capturing the bandwidth for the UE and the network node while also supporting separating the UE FDRSB and the network node FDRSB.

In some aspects, a network node FDRSB (e.g., transmission FDRSB) and a UE FDRSB (e.g., reception FDRSB) may be simultaneously identified (e.g., over the entire bandwidth) by allocating two or more training symbols (e.g., time resources used for FDRSB training signals). More symbols may be used to improve processing gain for training signals.

In some aspects, an estimation process may support the network node to be assisted with a UE or multiple UEs to identify FDRSB correction (e.g., an FDRSB correction filter). The estimation process may also support each UE to identify UE FDRSB correction for FDRSB at the UE.

In some aspects, the UE and/or the network node may decide at which periodicity to perform FDRSB estimation (e.g., based at least in part on aging of a previous FDRSB estimation, a change in temperature, and/or an update in beamforming parameters). Additionally, or alternatively, the network node and/or the UE may decide how wide to configure the FDRSB training signal. For example, a width (e.g., in a frequency domain) of the FDRSB training signal may depend on a bandwidth used for transmissions by the network node (e.g., for transmissions of data and/or other communications). This improves accuracy of FDRSB correction relative to an FDRSB signal that is narrower than the bandwidth used for transmission by the UE and reduces power consumption relative to an FDRSB signal that is wider than the bandwidth used for transmission by the UE.

Based at least in part on the UE estimating a composite of the FDRSB (e.g., a total of FDRSBs from all network node antenna groups and/or transmission chains used by the network node), an estimation and correction dimension may be reduced, relative to estimating the FDRSB per transmission chain and correcting per transmission chain.

In some aspects, the UE may use a phase shifter when receiving the FDRSB training signal. The phase shifter may have a non-flat magnitude and/or phase response over the bandwidth (e.g., the phase shifter may not be an ideal phase shifter).

Each IQ modulator of the network node may be impaired with FDRSB, which can be modeled as: $Z_i[k]=S[k]+F_i[k] \cdot S^*[-k]$, where $S[k]$ is the FDRSB training signal in a frequency domain FD and $F_i[k]$ is the network node FDRSB impairment of the i-th modulator.

The received signal on the UE side may include $Z_i[k]$ after passing the beam-former and the channel:

$$Y[k] = \sum_i Z_i[k] \underbrace{\sum_j P_{ij}[k] H_{ij}[k]}_{G_i[k]} = \sum_i Z_i[k] G_i[k].$$

Substituting $Z_i[k]$ yields: $Y[k] =$ $$\sum_i (S[k] + F_i[k] \cdot S^*[-k]) G_i[k] = S[k] + \underbrace{\sum_i G_i[k]}_{C_{main}[k]} + S^*[-k] \underbrace{\sum_i G_i[k]F_i[k]}_{C_{gNb\text{-}FDRSB}[k]};$$

and $$Y[k] = S[k]C_{main}[k] + S^*[-k]C_{gNb\text{-}FDRSB}[k].$$

On the UE side, the received $Y[k]$ passes through the phase shifter: $Y[k] \Rightarrow Y[k] \cdot C[k]$. The UE reception IQ demodulator may then impair the signal with its own $$FDRSB: Y_2[k] = (Y[k]C[k]) + (Y^*[-k]C^*[-k])F_{UE\text{-}FDRSB}[k].$$

Substituting $Y[k] = S[k]C_{main}[k] + S^*[-k]C_{gNb\text{-}FDRSB}[k]$ yields: $Y_2[k] = (S[k]C_{main}[k] + S^*[-k]C_{gNb\text{-}FDRSB}[k])C[k] +$ $C^*[-k](S^*[-k]C^*_{main}[-k] + S[k]C^*_{gNb\text{-}FDRSB}[-k])F_{UE\text{-}FDRSB}[k] =$ $$S[k]\left(C_{main}[k]C[k] + C^*[-k]\underbrace{F_{UE\text{-}FDRSB}[k]C^*_{gNb\text{-}FDRSB}[k]}_{negligible\ O(FDRSB^2)}\right)$$

$+ S^*[-k](C^*_{main}[-k]F_{UE\text{-}FDRSB}[k]C^*[-k] + C_{gNb\text{-}FDRSB}[k]C[k]),$ resulting in: $Y_2[k] = S[k]\underbrace{C_{main}[k]C[k]}_{meas_1} +$ $$S^*[-k]\underbrace{(C^*_{main}[-k]C^*[-k]F_{UE\text{-}FDRSB}[k] + C_{gNb\text{-}FDRSB}[k]C[k])}_{meas_2}$$

The FDRSB training signal may be configured to support solving for the network node FDRSB and for the UE FDRSB. For example, the training signal $S[k]$ may include even subcarriers only for positive frequencies (e.g., frequencies above the carrier frequency) and odd subcarriers only for negative frequencies (e.g., below the carrier frequency). In this way, the FDRSB impairment, which is reflected on the mirror subcarriers, would always leak into a vacant tone, thus supporting measurement of: a measurement of the training signal:

$$S[k]\underbrace{C_{main}[k]C[k]}_{meas_1},$$

and a measurement of the FDRSB that leaked from the training signal to mirror subcarriers:

$$S^*[-k]\underbrace{(C^*_{main}[-k]C^*[-k]F_{UE\text{-}FDRSB}[k] + C_{gNb\text{-}FDRSB}[k]C[k])}_{meas_2}.$$

In some aspects, the FDRSB training signal may include a second stage in which the training signal $S[k]$ is flipped in the frequency domain and transmitted again. In this way, the UE may measure the FDRSB training signal (e.g., meas1) and the FDRSB (meas2) on subcarriers that were used for the other during a first stage. In some aspects, the second stage may be omitted and the UE may interpolate values of the FDRSB and the FDRSB training signal on missing subcarriers.

A measurement by the UE may include $$Y_2[k] = S[k]\underbrace{C_{main}[k]C[k]}_{meas_1} +$$

$$S*[-k]\underbrace{(C^*_{main}[-k]C*[-k]F_{UE\cdot FDRSB}[k] + C_{gNb\cdot FDRSB}[k]C[k])}_{meas_2}.$$

To measure the FDRSB training signal, the UE may receive the FDRSB training signal on active main tones k0={ ... −5 −3 −1 2 4 6 ... }. The UE may configure a phase shifter C[k] to a first value of shifting to be approximately $C^{(\varphi_1)}[k] \approx e^{j\varphi_1}$. The UE may measure a gain of a main tone (e.g., subcarriers on which the FDRSB training signal is transmitted): $meas_2^{(\varphi_1)} = C_{main}[k_0]C^{(\varphi_1)}[k_0]$ for k0={ ... −5 −3 −1 2 4 6 ... }; and for a mirror tone: $meas_2^{(\varphi_1)} = C^*_{main}[k_0]C^{(\varphi_1)*}[K_0]F_{UE\cdot FDRSB}[-k_0] + C_{gNb\cdot FDRSB}[-k_0]C^{(\varphi_1)}[-k_0]$ for k0={ ... −5 −3 −1 2 4 6 ... }.

The UE may receive a second transmission of a mirror version of training signal k0={ ... −6 −4 −2 1 3 5 ... }. The phase shifter may be held in its first mode and the UE may, again, measure a gain of a main tone: $meas_1^{(\varphi_1)} = C_{main}[k_0]C^{(\varphi_1)}[k_0]$, for k0={ ... −6 −4 −2 1 3 5 ... }; and for a mirror tone for k0={ ... −6 −4 −2 1 3 5 ... }. The $meas_1^{(\varphi_1)}$ may be re-written as $meas_3^{(\varphi_1)} = C_{main}[-k_0]C^{(\varphi_1)}[-k_0]$ for $k_0$={ ... −5 −3 −1 2 4 6 ... }.

The UE may apply the measurements to a first equation, where:

$$meas_2^{(\varphi_1)} = meas_3^{(\varphi_1)}\left(\frac{C_{gNb\cdot FDRSB}[-k_0]}{C_{main}[-k_0]}\right) + meas_1^{(\varphi_1)*}(F_{UE\cdot FDRSB}[-k_0]), \text{ for}$$

$$k_0 = \{\ldots -5-3-1\ 2\ 4\ 6\ \ldots\} \cup k_0 =$$

$$\{\ldots -6-4-2\ 1\ 3\ 5\ \ldots\} \Rightarrow \text{ for every sub carrier } k_0.$$

A second part of the FDRSB estimation may include a second part associated with a second phase shift. The UE may set the phase shifter C[k] to a second mode of roughly shifting by $C^{(\varphi_2)}[k] \approx e^{j\varphi_2}$ and may repeat processes for obtaining $meas_1^{(\varphi_2)}$, $meas_2^{(\varphi_2)}$, and $meas_3^{(\varphi_2)}$ using the second phase shift. The UE may use a second equation:

$$meas_2^{(\varphi_2)} = meas_3^{(\varphi_2)}\left(\frac{C_{gNb\cdot FDRSB}[-k_0]}{C_{main}[-k_0]}\right) + meas_1^{(\varphi_2)} * (F_{UE\cdot FDRSB}[-k_0]), \text{ for}$$

$$k_0 = \{\ldots -5-3-1\ 2\ 4\ 6\ \ldots\} \cup k_0 =$$

$$\{\ldots -6-4-2\ 1\ 3\ 5\ \ldots\} = > \text{ for every sub carrier } k_0.$$

The UE may combine equations for the first and second phase shifts to obtain:

$$meas_2^{(\varphi_1)} = meas_3^{(\varphi_1)}\left(\frac{C_{gNb\cdot FDRSB}[-k_0]}{C_{main}[-k_0]}\right) + meas_1^{(\varphi_1)} * (F_{UE\cdot FDRSB}[-k_0]) \text{ and}$$

$$meas_2^{(\varphi_2)} = meas_3^{(\varphi_2)}\left(\frac{C_{gNb\cdot FDRSB}[-k_0]}{C_{main}[-k_0]}\right) + meas_1^{(\varphi_2)} * (F_{UE\cdot FDRSB}[-k_0]).$$

The UE may solve for $$\left(\frac{C_{gNb\cdot FDRSB}[-k_0]}{C_{main}[-k_0]}\right)$$

an ($F_{UE\cdot FDRSB}[-k_0]$), which are the optimal FDRSB corrections for the network node and for the UE, respectively.

Bypassing the phase shifter on the UE side (e.g., after FDRSB estimation is over), the UE may observe: $Y_2[k]=S[k]C_{main}[k]+S*[-k](C^*_{main}[-k]F_{UE\cdot FDRSB}[k]+C_{gNb\cdot FDRSB}[k])$. Based at least in part on this, the network node FDRSB correction filter is $$\left(\frac{C_{gNb\cdot FDRSB}[k]}{C_{main}[k]}\right),$$

and the UE FDRSB correction filter is $(F_{UE\cdot FDRSB}[k]) \cdot S[k] \xrightarrow{gNbFDRSB\ correction} S[k] - S^*[-k]\left(\frac{C_{gNb\cdot FDRSB}[k]}{C_{main}[k]}\right)$ and $$Y_2[k] \xrightarrow{UEFDRSB\ correction} Y_2[k] - Y_2^*[-k](F_{UE\cdot FDRSB}[k]).$$

Substituting the network node FDRSB correction equation yields the following received signal: $Y_2[k] =$ $$\underbrace{\left(S[k] - S^*[-k]\left(\frac{C_{gNb\cdot FDRSB}[k]}{C_{main}[k]}\right)\right)}_{Replace\ S[k]}C_{main}[k] + \underbrace{\left(S^*[-k] - S[k]\left(\frac{C^*_{gNb\cdot FDRSB}[-k]}{C^*_{main}[-k]}\right)\right)}_{Replace\ S^*[-k]}$$

$$(C^*_{main}[-k]F_{UE\cdot FDRSB}[k] + C_{gNb\cdot FDRSB}[k]) =$$

$$S[k]C_{main}[k] - S^*[-k]C_{gNB\cdot FDRSB}[k] + S^*[-k]C_{gNb\cdot FDRSB}[k] +$$

$$S^*[-k]C^*_{main}[-k]F_{UE\cdot FDRSB}[k] - S[k]\left(\frac{C^*_{gNb\cdot FDRSB}[-k]}{C^*_{main}[-k]}\right)C_{gNb\cdot FDRSB}[k].$$

This can remove network node FDRSB, but includes untreated UE FDRSB: $Y_2[k] \approx S[k]C_{main}[k]+S*[-k]C^*_{main}[-k]F_{UE\cdot FDRSB}[k]$.

Applying the UE FDRSB correction equation yields:

$$Y_2[k] \xrightarrow{UE\ FDRSB\ correction} Y_2[k] - Y_2^*[-k]F_{UE\cdot FDRSB}[k]) =$$

$$\underbrace{S[k]C_{main}[k] + S^*[-k]C^*_{main}[-k]F_{UE\cdot FDRSB}[k]}_{Replace\ Y_2[k]} -$$

$$\underbrace{(S^*[-k]C^*_{main}[-k] + S[k]C_{main}[k]F^*_{UE\cdot FDRSB}[-k])}_{Replace\ Y_2^*[-k]}(F_{UE\cdot FDRSB}[k]) ==$$

$$S[k]C_{main}[k] + S^*[-k]C^*_{main}[-k]F_{UE\cdot FDRSB}[k] -$$

$$S^*[-k]C^*_{main}[-k]F_{UE\cdot FDRSB}[k] + O(F^2_{UE\cdot FDRSB}).$$

Based at least in part on canceling out the equation above, a cleaned $Y_2[k]=S[k]C_{main}[k]+$no FDRSB.

In some aspects, the first phase shifter value and the second phase shifter value may be 90 degrees out of phase. However other values of phase shifter would work as well. Some values may use repetition of the training process to compensate for noise enhancement with processing gain.

Additionally, the phase shifter is allowed to have a non-flat phase and/or magnitude response, since the set of equations above does not assume ideal phase shifters.

Based at least in part on the UE supporting identification of the network node FDRSB (also referred to as gNB FDRSB) and UE FDRSB from a same FDRSB training signal (e.g., using two or more time resources that may be consecutive), the UE may conserve computing power, network, and/or communication resources that may have otherwise been used to obtain the network node FDRSB and the UE FDRSB separately.

Figure 5:
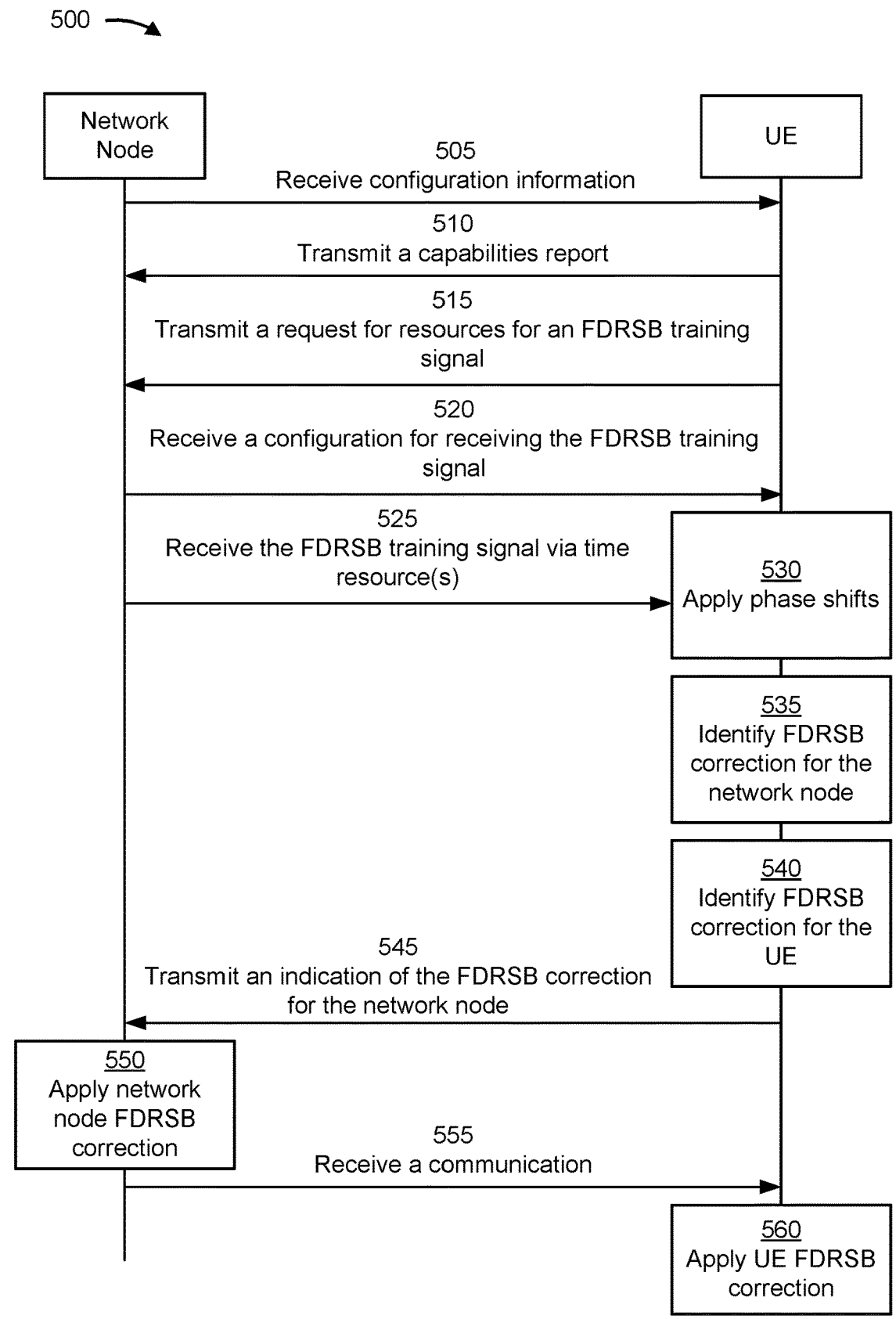
FIG. 5 is a diagram of an example associated with frequency dependent residual side band (FDRSB) training signals, in accordance with the present disclosure.

FIG. 5 is a diagram of an example 500 associated with FDRSB training signals, in accordance with the present disclosure. As shown in FIG. 5, a network node (e.g., network node 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 5.

As shown by reference number 505, the network node may transmit, and the UE may receive, configuration information. In some aspects, the UE may receive the configuration information via one or more of radio resource control (RRC) signaling, control information (DCI), among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to transmit a request for an allocation for receiving an FDRSB training signal. In some aspects, the configuration information may indicate that the UE is to request the allocation for transmitting the FDRSB training signal based at least in part on one or more conditions, such as a change in temperature, a change in channel conditions, a change in transmission beam, and/or a change in transmission power or other parameters, among other examples. In some aspects, the configuration information may indicate that the UE is to receive the FDRSB training signal with vacancies on mirror subcarriers (e.g., subcarriers used to transmit the FDRSB training signal may have vacant and/or empty mirror subcarriers). In some aspects, the configuration information may indicate a pattern and/or resolution for receiving the FDRSB training signal.

The UE may configure itself based at least in part on the configuration information. In some aspects, the UE may be configured to perform one or more operations described herein based at least in part on the configuration information.

As shown by reference number 510, the UE may transmit, and the network node may receive, a capabilities report. In some aspects, the capabilities report may indicate UE support for joint identification of network node FDRSB and UE FDRSB using a same FDRSB training signal (e.g., a multi-symbol FDRSB training signal). In some aspects, the capabilities report may indicate support for one or more candidate patterns and/or candidate resolutions for transmitting the FDRSB training signal.

As shown by reference number 515, the UE may transmit, and the network node may receive, a request for an allocation for receiving an FDRSB training signal. In some aspects, the UE may transmit the request based at least in part on a change of channel conditions, temperature conditions, and/or beamforming parameters, among other examples.

As shown by reference number 520, the UE may receive, and the network node may transmit, a configuration for receiving the FDRSB training signal. In some aspects, the network node may transmit the configuration based at least in part on receiving the request described in connection with reference number 515. In some aspects, the network node may transmit the configuration independently from (e.g., in the absence of) receiving the request described in connection with reference number 515. For example, the network node may transmit the configuration (e.g., an allocation for receiving the FDRSB training signal) based at least in part on detecting a change in temperature, channel conditions, and/or beamforming parameters (e.g., precoding), among other examples. In some aspects, the network node may transmit the configuration based at least in part on a request from the UE, a periodicity of the FDRSB training signal, and/or an amount of time from a most recent FDRSB training signal.

In some aspects, the configuration may indicate selection of a pattern for transmitting the FDRSB training signal. For example, the configuration may indicate selection of a first pattern of the first set of subcarriers and/or a second pattern of the second set of subcarriers from a set of candidate subcarrier patterns for FDRSB training signals. In some aspects, the selection of the first pattern and/or or the second pattern is based at least in part on a selection by the UE or a selection by a network node associated with the FDRSB correction.

As shown by reference number 525, the UE may receive, and the network node may transmit, the FDRSB training signal on a first set of subcarriers and a second set of subcarriers, with a mirror of the first set of subcarriers being non-overlapping with the second set of subcarriers. Additionally, or alternatively, a mirror of the second set of subcarriers about the carrier frequency may be non-overlapping with the first set of subcarriers. For example, the network node may transmit the FDRSB training signal on a first set of subcarriers that are lower than a carrier frequency and on a second set of subcarriers that are higher than the carrier frequency, with a mirror of the first set of subcarriers about the carrier frequency being non-overlapping with the second set of subcarriers.

In some aspects, the mirror of the first set of subcarriers may be interleaved with the second set of subcarriers. In some aspects, a combination of the first set of subcarriers and the second set of subcarriers spans a first range of subcarriers that includes a second range of subcarriers on which the UE is configured to communicate with the network node associated with the FDRSB correction. For example, the network node may transmit the FDRSB training signal on the first set of subcarriers that is at least as wide as the second range of subcarriers and includes the second set of subcarriers such that the FDRSB training signal spans at least the frequency domain of network node transmissions.

In some aspects, the UE may receive a first portion of the FDRSB training signal via a first time resource, where the first portion includes the FDRSB training signal on a first set of subcarriers that are lower than a carrier frequency and on a second set of subcarriers that are higher than the carrier frequency. A mirror of the first set of subcarriers about the carrier frequency may be non-overlapping with the second set of subcarriers. The UE may also receive a second portion of the FDRSB training signal via a second time resource, where the second portion includes the FDRSB training signal on a third set of subcarriers that are lower than the carrier frequency and on a fourth set of subcarriers that are higher than the carrier frequency, with a mirror of the third set of subcarriers about the carrier frequency being non-overlapping with the fourth set of subcarriers. In some aspects, the mirror of the first set of subcarriers includes the third set of subcarriers, a mirror of the second set of subcarriers includes the fourth set of subcarriers, the mirror of the third set of subcarriers includes the first set of subcarriers, and/or a mirror of the fourth set of subcarriers includes the second set of subcarriers.

In some aspects, the UE may interpolate network node FDRSB correction information associated with the first set of subcarriers and/or the second set of subcarriers. In some aspects, the UE may interpolate UE FDRSB correction information associated with the first set of subcarriers and/or the second set of subcarriers.

In some aspects, the UE may use a pattern identified in the configuration for receiving the FDRSB training signal, in the configuration information, and/or in a communication protocol, among other examples. The pattern may have an even resolution (e.g., with a consistent spacing between subcarriers of the first set of subcarriers and/or between subcarriers of the second set of subcarriers) or have irregular spacing. The pattern may be configured with signal vacancy on subcarriers that are mirrors from subcarriers carrying the FDRSB training signal (e.g., the first set of subcarriers and the second set of subcarriers). For example, the network node may not transmit a signal on, or may allocate no transmission power to, the subcarriers that are mirrors from the subcarriers carrying the FDRSB training signal.

In some aspects, the UE may receive the FDRSB training signal based at least in part on a periodicity for transmitting the FDRSB training signal, a request for FDRSB correction from a network node associated with the FDRSB correction, an update to one or more of a precoder or a beam used for a transmission to the network node, or an update to a temperature at the UE, among other examples. In some aspects, the periodicity may be based at least in part on a requested periodicity indicated by the UE, a configuration from the network node, or a communication protocol, among other examples.

In some aspects, the UE may receive the FDRSB training signal using a number of time resources that is based at least in part on a signal strength associated with communications between the UE and the network node associated with the FDRSB correction. For example, the network node may use more than two time resources for the FDRSB training signal based at least in part on a signal strength (e.g., SNR) failing to satisfy a threshold. Using multiple time resources may support processing gains that may improve coverage of the FDRSB training signal and/or improve accuracy of the FDRSB correction.

In some aspects, the UE may receive one or more additional iterations of the FDRSB training signal. In these aspects, identification of the network node FDRSB correction information may be based at least in part on the one or more additional iterations of the FDRSB training signal. In some aspects, the UE may receive the one or more additional iterations of the FDRSB training signal based at least in part on an associated channel having an SNR that fails to satisfy a threshold (e.g., to improve processing gains).

As shown by reference number 530, the UE may apply phase shifts when receiving the FDRSB training signals. In some aspects, the UE may receive a first portion of the FDRSB training signal via a first time resource and using a first phase shift, and may receive a second portion of the FDRSB training signal via a second time resource and using a second phase shift that is different from the first phase shift. For example, the first phase shift and the second phase shift may be out of phase by approximately 90 degrees.

As shown by reference number 535, the UE may identify FDRSB correction for the network node (e.g., network node FDRSB correction) based at least in part on the FDRSB training signal.

As shown by reference number 540, the UE may identify FDRSB for the UE (e.g., UE FDRSB correction) based at least in part on the FDRSB training signal. In some aspects, the UE FDRSB correction is based at least in part on a difference in measurements of the FDRSB training signal during the first time resource and measurements of the FDRSB training signal during the second time resource.

As shown by reference number 545, the UE may transmit, and the network node may receive, an indication of the FDRSB correction for the network node. In some aspects, the indication of the FDRSB correction may indicate a filter or other processing parameters to apply to signals before transmitting, with the filter or other processing parameters configured to reduce FDRSB by the network node. In some aspects, the UE may transmit the indication of network node FDRSB correction information that is based at least in part on the FDRSB training signal.

As shown by reference number 550, the network node may apply FDRSB correction. For example, the network node may apply a filter and/or other modification to a signal before transmitting the signal OTA. In some aspects, the network node may multiply a signal by a matrix that applies the FDRSB correction.

As shown by reference number 555, the UE may receive, and the network node may transmit, a communication having the network node FDRSB correction applied.

As shown by reference number 560, the UE may apply FDRSB correction. For example, the UE may apply a filter and/or other modification to a signal after receiving the signal. In some aspects, the UE may multiply a signal by a matrix that applies the FDRSB correction for the UE.

Based at least in part on the UE supporting identification of the network node FDRSB (a.so referred to as gNB FDRSB) and UE FDRSB from a same FDRSB training signal (e.g., using two or more time resources that may be consecutive), the UE may conserve computing power, network, and/or communication resources that may have otherwise been used to obtain the network node FDRSB and the UE FDRSB separately.

As indicated above, FIG. 5 is provided as an example. Other examples may differ from what is described with respect to FIG. 5.

Figure 6:
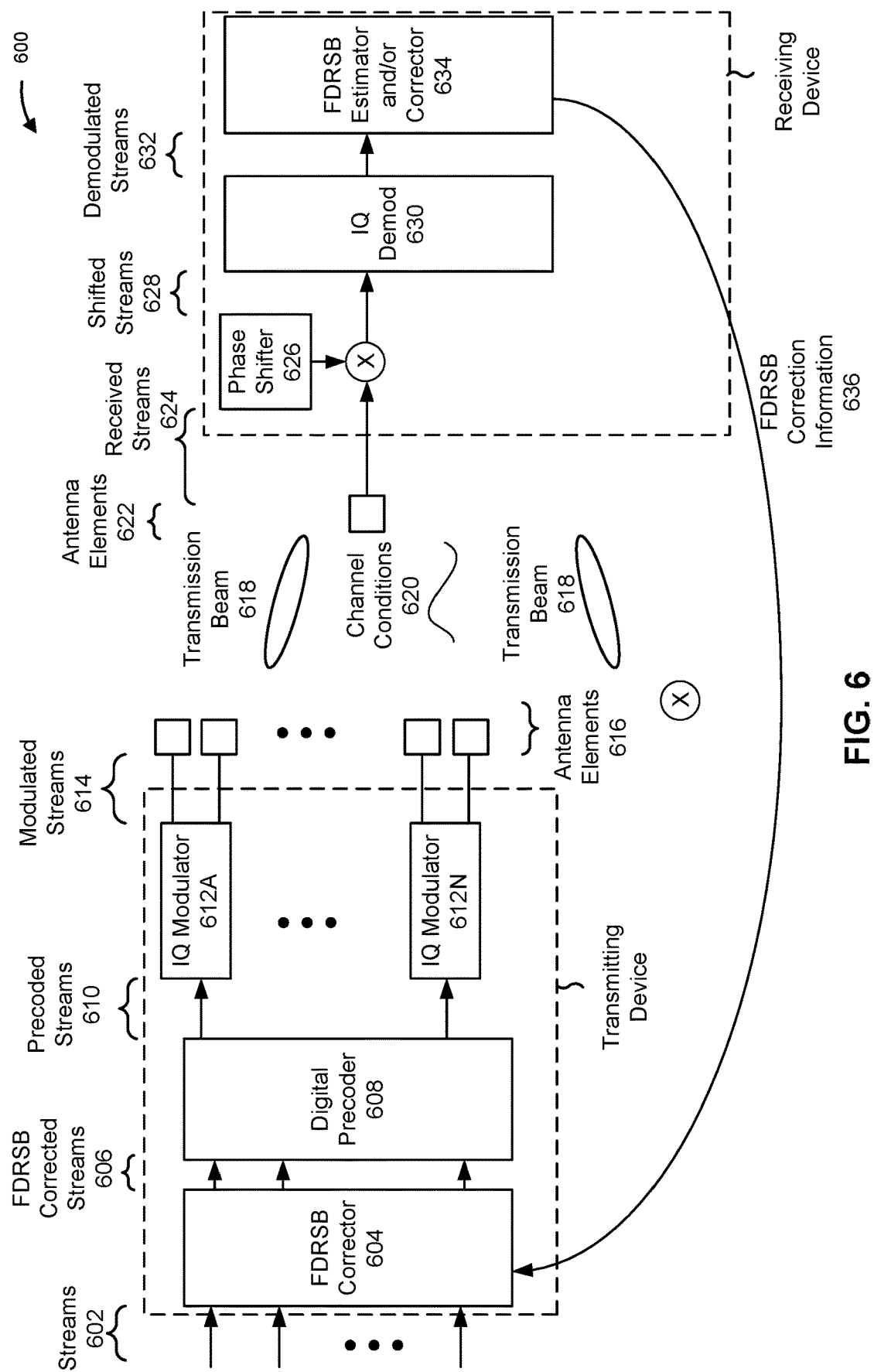
FIG. 6 is a diagram illustrating an example of a communication having FDRSB, in accordance with the present disclosure.

FIG. 6 is a diagram illustrating an example 600 of a communication having FDRSB, in accordance with the present disclosure. As shown in FIG. 6, a transmitting device may transmit a communication to a receiving device. The transmitting device may use multiple antenna elements (also referred to as "antennas") to transmit the communication using beamforming. The communication may include signals transmitted via multiple time-frequency resources (e.g., via multiple subcarriers and/or resource blocks on one or more symbols and/or slots). The communication may include an FDRSB training signal and/or one or more streams of data, among other examples.

As shown in FIG. 6, the transmitting device may receive multiple streams 602 for transmission to the receiving device. The streams may include an FDRSB training signal, data, and/or control signaling for transmission to the receiving device. The transmitting device may use an FDRSB corrector 604 to generate FDRSB corrected streams 606 from the streams 602. In some aspects, the transmitting device may use the FDRSB corrector 604 based at least in part on the multiple streams 602 including data and/or control signaling and/or based at least in part on the multiple streams 602 not including an FDRSB training signal (e.g., an uncorrected FDRSB training signal may be used to identify FDRSB correction information). For example, the transmitting device may apply an FDRSB correction that is based at least in part on feedback from the receiving device, as described herein.

The transmitting device may use a digital precoder 608 to apply precoding to the FDRSB corrected streams 606 to generate precoded streams 610. The digital precoder 608 may provide (e.g., directly or indirectly) the precoded streams 610 to a set of IQ modulators 612 (e.g., IQ modulators 612A through 612N). The IQ modulators 612 may modulate the precoded streams 610 to map bits of the precoded streams 610 to constellation points associated with bit values of the precoded streams 610. For example, the IQ modulators 612 may apply modulation based at least in part on applying amplitudes, in a Q dimension and an I dimension in an IQ plane, according to an MCS of communications to the receiving device.

The IQ modulators 612 may cause FDRSB (e.g., an IQ mismatch, an FDRSB impairment, and/or FDRSB error) to the precoded streams 610 based at least in part on, for example, imperfections of the IQ modulators 612. This FDRSB may cause signaling on a first subcarrier to interfere with a second subcarrier that is a mirror of the first subcarrier about a carrier frequency. For example, the first subcarrier may be a distance from the carrier frequency in a positive direction (e.g., above the carrier frequency), and the second subcarrier may be the same distance from the carrier frequency in a negative direction (e.g., below the carrier frequency). In another example, a subcarrier at location +n may interfere with a subcarrier at location −n, where location 0 (zero) is the carrier frequency.

The IQ modulators 612 may provide modulated streams 614 to antenna elements 616 for transmission over the air to the receiving device. Based at least in part on precoding, the antenna elements 616 may transmit the modulated streams via one or more transmission beams 618. As the modulated signals of the modulated streams propagate over the air to the receiving device, channel conditions 620 may affect the modulated streams. For example, the channel conditions 620 may affect an SNR and/or an SINR of the modulated signals as received at the receiving device.

The receiving device may use one or more antenna elements 622 to receive the modulated streams 614 having effects from channel conditions 620. Additionally, based at least in part on transmission using the IQ modulators 612, the modulated streams 614 may have FDRSB. Received streams 624 (e.g., the modulated signals having effects of channel conditions 620 and FDRSB) may be shifted based at least in part on combining the received streams 624 with an output of a phase shifter 626 (e.g., based at least in part on the received streams including an FDRSB training signal). The phase shifter 626 may apply a first phase shift to a first portion of a communication carried on the received streams 624 (e.g., to FDRSB training signal on a first time resource, such as a symbol) and/or may apply a second phase shift to a second portion of the communication carried on the received streams 624. In this way, the first portion may have a different phase shift applied than a second portion. The receiving device may apply the phase shifter to only received streams 624 that include an FDRSB training signal and/or may not apply the phase shifter 626 to received streams 624 that include data.

The receiving device may provide shifted streams 628 to an IQ demodulator (IQ demod) 630. The IQ demodulator 630 may demodulate the shifted streams 628. IQ demodulator 630 may introduce receiver FDRSB to the shifted streams 628 based at least in part on imperfections of the IQ demodulator 630. The IQ demodulator 630 may provide demodulated streams 632, having receiver FDRSB applied (e.g., from the IQ demodulator 630) and transmitter FDRSB applied (e.g., from the IQ modulators 612), to an FDRSB estimator and/or corrector 634. The FDRSB estimator and/or corrector 634 may estimate and/or identify transmitter FDRSB and receiver FDRSB based at least in part on the demodulated streams 632 having both FDRSBs applied and based at least in part on the phase shifter 626 applying different phase shifts to the received streams in different time resources. The receiving device may provide FDRSB correction information 636, including transmitter FDRSB correction information, to the transmitting device. Additionally, or alternatively, the receiving device may identify and/or store receiver FDRSB correction information for application by the FDRSB estimator and/or corrector 634 or by the IQ demodulator 630 to subsequent communications from the transmitting device.

In this way, the receiving device may use the FDRSB training signal, received via one or more time resources, to obtain FDRSB correction information for the transmitting device and the receiving device.

As indicated above, FIG. 6 is provided as an example. Other examples may differ from what is described with regard to FIG. 6.

Figure 7:
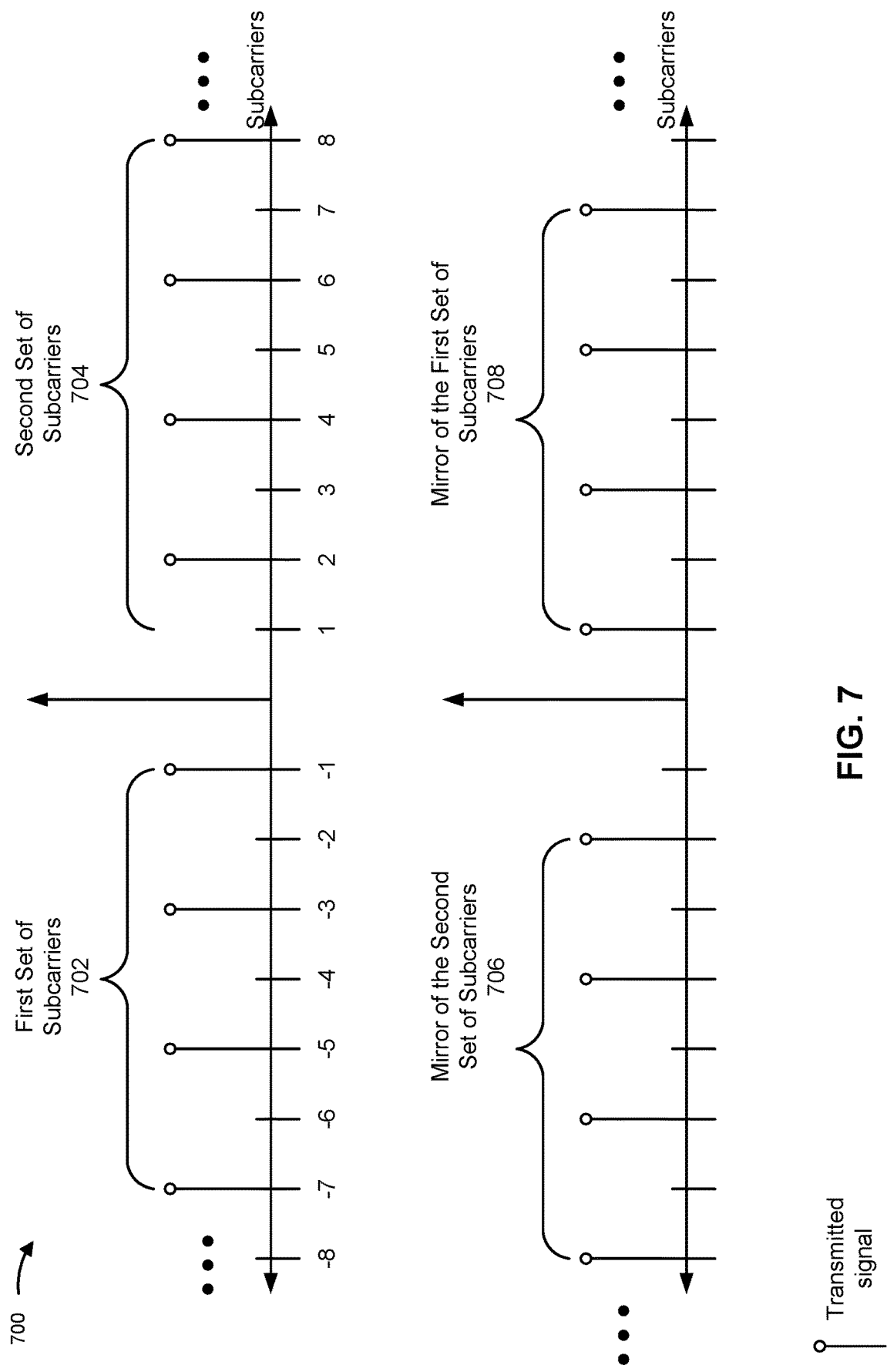
FIG. 7 is a diagram illustrating an example of an FDRSB pattern, in accordance with the present disclosure.

FIG. 7 is a diagram illustrating an example 700 of an FDRSB pattern, in accordance with the present disclosure. In some aspects, a transmitting device, such as a network node, may apply the FDRSB pattern for transmission of FDRSB training signals. As shown by reference number 700, the transmitting device may transmit FDRSB training signals on a first set of subcarriers 702 and a second set of subcarriers 704.

A mirror 706 of the second set of subcarriers 704 is shown at locations that are mirrored about a center frequency from subcarriers of the second set of subcarriers 704. The mirror 706 of the second set of subcarriers 704 may be interleaved with the first set of subcarriers 702. For example, a subcarrier of the mirror 706 of the second set of subcarriers 704 may be at a frequency location that is between subcarriers that are occupied by subcarriers of the first set of subcarriers 702 (e.g., between consecutive occupied subcarriers of the first set of subcarriers 702).

Similarly, mirror 708 of the first set of subcarriers 702 is shown at locations that are mirrored about a center frequency from subcarriers of the first set of subcarriers 702. The mirror 706 of the first set of subcarriers 702 may be interleaved with the first set of subcarriers 702. For example, a subcarrier of the mirror 708 of the first set of subcarriers 702 may be at a frequency location that is between subcarriers that are occupied by subcarriers of the second set of subcarriers 704 (e.g., between consecutive occupied subcarriers of the second set of subcarriers 704).

In some aspects, the UE may measure FDRSB on subcarriers of the mirror 706 of the second set of subcarriers 704 and on subcarriers of the mirror 708 of the second set of subcarriers 702. Based at least in part on measuring the FDRSB on vacant subcarriers (e.g., vacant from a transmission perspective, but including FDRSB), the UE may measure the FDRSB separately from the FDRSB training signal as transmitted by the network node.

In some aspects, the UE may receive the FDRSB training signal on an additional time resource (e.g., a second time resources, such as a symbol, that is adjacent to a first time resource that included the FDRSB transmitted on the first set of subcarriers 702 and the second set of subcarriers 704). In some aspects, the FDRSB training signal on the additional time resource may include the FDRSB training signal transmitted on a third set of subcarriers and a fourth set of subcarriers that are different from the first set of subcarriers and the second set of subcarriers. For example, the third set of subcarriers may include the mirror 706 of the second set of subcarriers 704 and the fourth set of subcarriers may include the mirror 708 of the first set of subcarriers 702.

Based at least in part on the UE receiving the FDRSB training signal on the first time resource and on the second time resource, the UE may measure FDRSB on additional subcarriers. Alternatively, where the UE receives the FDRSB training signal on only the first time resource, the UE may extrapolate FDRSB for subcarriers that are not within the mirror 706 of the second set of subcarriers 704 or the mirror 708 of the first set of subcarriers 702 (e.g., for subcarriers of the first set of subcarriers 702 and the subcarriers of the second set of subcarriers 704).

In some aspects, the UE may receive the FDRSB training signal, having a pattern as shown in example 700 or in another pattern, during a first time and/or second time resource, and apply a first phase shift. The UE may additionally receive the FDRSB training signal on a third and/or fourth time resource and apply a second phase shift. The UE may use the different phase shifts to separate UE FDRSB from network node FDRSB. The UE may apply FDRSB correction based at least in part on the UE FDRSB and may provide the network node FDRSB and/or correction information to the network node for the network node to apply network node FDRSB correction to transmissions.

As indicated above, FIG. 7 is provided as an example. Other examples may differ from what is described with regard to FIG. 7. For example, other patterns may be used for the first set of subcarriers 702 and the second set of subcarriers 704. The other patterns may have different densities (e.g., with a different number of vacant subcarriers between consecutive and/or adjacent occupied subcarriers), variable densities (e.g., where numbers of vacant subcarriers between consecutive and/or adjacent occupied subcarriers are not required to be the same), different lengths (e.g., numbers of consecutive subcarriers that are occupied in a pattern such as {1,1,0,0,1,1,0,0 . . . }, with 1 indicating occupied subcarriers and 0 indicating vacant subcarriers), among other examples.

In some networks (e.g., sub-THz networks), a network node may use multiple antennas (e.g., multi-panel, multi-TRP, multi-RRH network nodes) connected to multiple IQ modulators to improve beam forming. In some of these networks, the network node may be burdened with estimation of the FDRSB for each associated IQ modulator, such as IQ modulators at the multiple antennas, which may not be co-located (e.g., for configurations with multiple TRPs or multiple RRHs, among other examples). This incurs high cost and complexity for the network node to perform an FDRSB mitigation procedure, as the network node may require hardware (e.g., dedicated hardware) for that purpose, with the hardware including an RF feedback chain for each of the multiple modulators, a sampler (e.g., an ADC), and/or an FDRSB estimator.

In some aspects, the UE may use a multi-port FDRSB training signal (e.g., associated with multi-panel, multi-TRP, and/or multi-RRH communications) along with a PHY procedure such that the network node may assist the UE in canceling associated transmission FDRSB (e.g., downlink FDRSB) over multi-port, multi-panel, multi-TRP, and/or multi-RRH communications. The FDRSB training signal may reduce a complexity of an FDRSB correction procedure in which the UE estimates the composite network node FDRSB. For example, the FDRSB training signal may support capturing both the multi-port FDRSB as well as wide-band properties, thus enabling OTA feedback of the correction filters to the network node. The network node may inform the UE of a slot or other time resource at which the FDRSB training signal is to be transmitted (e.g., with an indication of one or more symbols on which the FDRSB training signal is to be transmitted). The UE may measure the FDRSB training signal and provide feedback as FDRSB correction information based at least in part on a calculated FDRSB correction filter.

In some aspects, the network node may transmit a special training signal that allows for low complexity and fast estimation of a composite FDRSB over multiple (e.g., all) transmit ports of the network node in multi-TRP mode, multi-RRH mode, and/or a multi-panel mode). The UE may perform FDRSB estimation for multi-port or multi-TRP modes using a single FDRSB training signal as a result of a structure of the FDRSB training signal.

In this way, the network node may send a training signal to the UE from which the UE may estimate FDRSB correction information for a composite of all IQ modulators associated with network node transmission antennas (e.g., all active transmission antennas), which may reduce consumption of network node resources (e.g., computing and/or power resources) and may reduce hardware costs associated with FDRSB suppression for multiple network node transmission antennas, in comparison to estimating per transmission chain and correcting per transmission chain in different resources.

Using the transmission signal, the network node may collect FDRSB correction responses from various UEs and combine them (e.g., average them), which may improve accuracy of FDRSB correction information and/or may improve FDRSB suppression. The network node cannot estimate a composite FDRSB using local detection and/or measurements because the network node has no knowledge of a channel transfer function as observed by the UE (e.g., the composite FDRSB depends on the channel).

In some aspects, the network node may use fast training for FDRSB correction. Fast training may include capturing FDRSB responses (e.g., associated with FDRSB correction information) associated with the multiple transmission antennas and the multiple ports, rather than having the network node estimate each of them separately (e.g., per port and per IQ modulator). Based at least in part on the FDRSB varying over time and/or temperature, the network node may update FDRSB correction often, making fast training conserve network resources and/or improve accuracy associated with updating FDRSB correction. In some aspects, the network node may decide a periodicity to use for FDRSB estimation. The periodicity may be based at least in part on environmental factors that affect a rate at which the FDRSB may vary, overhead consumed by the FDRSB training signal, and/or throughput that is based at least in part on overhead and error rates, among other examples.

Based at least in part on the UE providing the FDRSB correction information (e.g., FDRSB feedback and/or overthe-air-estimated composite FDRSB correction information) to the network node, the network node may transmit communications with reduced FDRSB. In this way, the UE may receive the communications with reduced error rates and/or with increased spectral efficiency.

Each of the IQ modulators are impaired with FDRSB impairment, which can be modeled as $Z_n^{(p)}[k]=S_n[k]+F_n^{(p)}[k]\cdot S_n^*[-k]$. $\{S_n[k]\}_{n=1}^N$ is the multi-port precoded training signal in the frequency domain (e.g., assume that initially, an FDRSB correction unit is bypassed in this stage). $\{F_n^{(p)}[k]\}$ is the FDRSB impairment of the ith IQ modulator in the pth RRH. F×S is the FDRSB.

The received signal $Y_r[k]$ on the rth reception UE antenna includes $Z_n^{(p)}[k]$ after passing the analog beam-former and the channel as:

$$Y_r[k] = \sum_{p=1\ldots M}\sum_{n=1\ldots N} Z_n^{(p)}[k] \underbrace{\sum_{j=1\ldots N_{tx\text{-}ant}} P_{nj}^{(p)}[k]H_{jr}^{(p)}[k]}_{G_{nr}^{(p)}[k]} =$$

$$\sum_{p=1\ldots M}\sum_{n=1\ldots N} Z_n^{(p)}[k]G_{nr}^{(p)}[k] + \underbrace{N_r[k]}_{AWGN}$$

Substituting $Z_n^{(p)}[k]$ yields:

$$Y_r[k] = \sum_{p=1\ldots M}\sum_{n=1\ldots N}(S_n[k]+F_n^{(p)}[k]\cdot S_n^*[-k])[k]G_{nr}^{(p)}[k] + N_r[k] =$$

$$\sum_{n=1\ldots N} S_n[k]\underbrace{\sum_{p=1\ldots M} G_{nr}^{(p)}[k]}_{C_{nr}[k]} + \sum_{n=1\ldots N} S_n^*[k]\underbrace{\sum_{p=1\ldots M} F_n^{(p)}[k]G_{nr}^{(p)}[k]}_{I_{nr}[k]} + N_r[k]$$

As shown in the model above, the rth reception UE antenna receives a desired component interfered with an undesired composite FDRSB term:

$$Y_r[k] = \sum_{n=1\ldots N} S_n[k]C_{nr}[k] + \sum_{n=1\ldots N} S_n^*[-k]I_{nr}[k] + N_r[k]$$

where $\Sigma_{n=1\ldots N} S_n[k]C_{nr}[k]$ is the desired component and $\Sigma_{n=1\ldots N} S_n^*[-k]I_{nr}[k]+N_r[k]$ is the undesired composite FDRSB term. A transformation of layers x=>digital precoder D=>precoded signal S is $S_n[k]=\Sigma_{i=1\ldots nlayers} x_i[k]D_{ni}[k]$.

The equations may be combined to form:

$$Y_r[k] = \sum_{n=1\ldots N}\left(\sum_{i=1\ldots nlayers} x_i[k]D_{ni}[k]\right)C_{nr}[k] +$$

$$\sum_{n=1\ldots N}\left(\sum_{i=1\ldots nlayers} x_i^*[-k]D_{ni}^*[-k]\right)I_{nr}[k] + N_r[k]$$

Thus, the $r^{th}$ receive antenna sees a desired component (e.g., a linear combination of the layers) interfered with undesired FDRSB component:

$$Y_r[k] = \sum_{n=1\ldots N} x_i[k]\left(\sum_{n=1\ldots N} D_{ni}[k]C_{nr}[k]\right) +$$

$$\sum_{i=1\ldots nlayers} x_i^*[-k]\left(\sum_{n=1\ldots N} D_{ni}^*[-k]I_{nr}[k]\right) + N_r[k]$$

An unbiased MMSE equalizer applied to the received signal $\{Y_r[k]\}_{r=1}^{nrx}$ will suppress the inter layer leakage in the desired term, but will be unable to treat the FDRSB term.

Denoting the equalizer as $E_{ir}[k]$, the $(i,r)^{th}$ element of the unbiased MMSE equalizer matrix (L is FDRSB leakage) has an output of:

$$\hat{x}_i[k] = \sum_{r=1\ldots nrx} E_{ir}[k]Y_r[k] =$$

$$x_i[k] + \underbrace{\left(\sum_{j\neq i}\varepsilon_j[k]x_j[k]\right)}_{\text{negligible residual inter layer leakage}} + \sum_{j=1\ldots nlayers} x_j^*[-k]L_{ij}[k],$$

where $\varepsilon_j[k]$ denotes a negligible level of residual un-equalized inter-layer leakage and $L_{ij}[k]$ represents the FDRSB leakage level of the $j^{th}$ layer into $i^{th}$ layer when observing at the equalizer output: $\hat{x}_i[k]\approx x_i[k]+\Sigma_{j=1\ldots nlayers} x^*_j[-k]L_{ij}[k]$.

An estimation unit of the UE may estimate the FDRSB leakage coefficients $L_{ij}[k] j^{th}$ layer=>$i^{th}$ layer at frequency bin k may be:

$$\hat{x}_i[k] \cong x_i[k] + \sum_{j=1\ldots nlayers} x_j^*[-k]L_{ij}[k]$$

where the coefficients $L_{ij}[k]$ may be feedbacked from the UE to the network node for applying FDRSB correction in a layers domain in the following form:

$$x_i^{cor}[k] = x_i[k] - \sum_{j=1\ldots nlayers} x_j^*[-k]L_{ij}[k]$$

Then the equalizer output would be free of FDRSB:

$$\hat{x}_i[k] \cong x_i^{cor}[k] + \sum_{j=1\ldots nlayers} x_j^{cor*}[-k]L_{ij}[k] =$$

$$\left(x_i[k] - \sum_{j=1\ldots nlayers} x_j^*[-k]L_{ij}[k]\right) +$$

$$\sum_{j=1\ldots nlayers}\left(x_j[-k] - \sum_{j_0=1\ldots nlayers} x_{j_0}^*[k]L_{jj_0}[-k]\right)^* L_{ij}[k]$$

and then:

$$\hat{x}_i[k] \cong x_i[k] - \sum_{j_0=1\ldots nlayers} x_{j_0}[k]\sum_{j=1\ldots nlayers} L_{ij}[k]L_{jj_0}^*[-k],$$

which provides an FDRSB-free signal (e.g., or with negligible FDRSB):

$$\hat{x}_i[k] \cong x_i[k] - \sum_{j_0=1\ldots nlayers} x_{j_0}[k]\sum_{j=1\ldots nlayers} L_{ij}[k]L_{jj_0}^*[-k]$$

The FDRSB-free signal on the reception side contains a negligible inter-layer leakage term (but no FDRSB leakage):

$$\hat{x}_i[k]\approx x_i[k]-\approx x_i[k$$

In the above expression, a residual inter-layer leakage is negligible because it is on the order of $L^2$. This means that if the IQ impairment L is around −30 dB, then this residual term is at the order of −60 dB. Furthermore, if needed, this term can be suppressed further on the UE side by using the equalizer output:

$$\hat{\hat{x}}_i[k] \cong \hat{x}_i[k] + \sum_{j_0=1\ldots nlayers} \hat{x}_{j_0}[k] \sum_{j=1\ldots nlayers} L_{ij}[k]L^*_{jj_0}[-k]$$

$$\cong x_i[k] + O(L^4)$$

In this way, the residual inter-layer leakage term would be reduced even further and would become even more negligible (at the order of $L^4$, where, for the example of 30 dB, the residual inter-layer leakage term would be 30 dB*4=120 dB). This can continue further (e.g., iteratively on different equalizers), until reaching a satisfactory level of negligible residual level of inter-layer leakage.

The training signal $\{x_i[k]\}_{i=port\ 1}^{port\ nlayers}$ may be configured in such a way that it enables simultaneous multi-port estimation of the inter-layer FDRSB leakage coefficients: jth layer=>ith layer at frequency bin k: $L_{ij}[k]$.

When observing at the equalizer output over the output vector of dimension Mayers: $\hat{x}_i[k] \approx x_i[k] + \Sigma_{j=1\ldots nlayers} x^*_j[-k]L_{ij}[k]$. The UE may estimate the leakage coefficients based at least in part on the multi-port training signal being designed so that a positive subcarrier always corresponds to a vacant mirror negative subcarrier (e.g., subcarriers on which the FDRSB training signal is transmitted have vacant mirrored subcarriers). In this way, a vacant subcarrier may become populated by a single component of FDRSB leakage, rather than a sum of leakages. This may support a simplified estimation of the FDRSB coefficient $L_{ij}[k]$.

In some aspects, the different ports may be FDM-spread along a frequency bandwidth. For example, subcarriers of different ports may be interleaved through the frequency bandwidth, such as shown in FIG. 7.

In some aspects, a multi-port training signal X[k] may take different shapes and/or patterns, as long as each subcarrier has a vacant mirror subcarrier.

The estimation of $L_{ij}[k]$ may provide a frequency resolution for FDRSB measurements of $2*n_{layer}$ (e.g., k=8 resolution in the example of $n_{layer}=4$). The UE may use interpolation along the frequency domain to calculate missing values of coefficients for FDRSB measurements (e.g., the UE may retrieve a coefficient value for every k). In some aspects, this interpolation can be performed by the network node to reduce the UE-to-network-node feedback traffic (e.g., overhead). An interpolation may provide satisfactory accuracy, since the FDRSB likely has slight variation across adjacent subcarriers.

Figure 8:
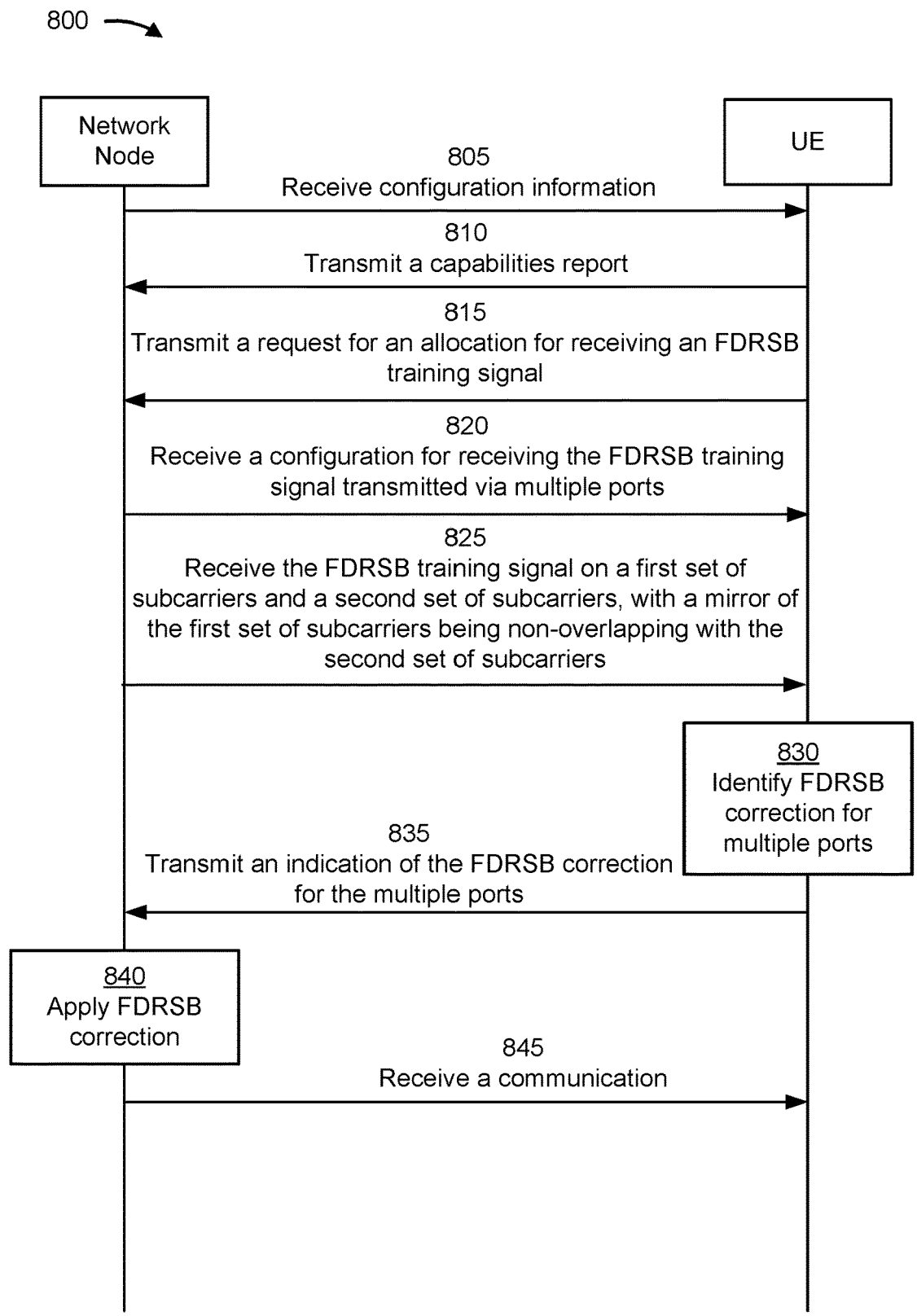
FIG. 8 is a diagram of an example associated with FDRSB training signals, in accordance with the present disclosure.

FIG. 8 is a diagram of an example 800 associated with FDRSB training signals, in accordance with the present disclosure. As shown in FIG. 8, a network node (e.g., network node 110, a CU, a DU, and/or an RU) may communicate with a UE (e.g., UE 120). In some aspects, the network node and the UE may be part of a wireless network (e.g., wireless network 100). The UE and the network node may have established a wireless connection prior to operations shown in FIG. 8.

As shown by reference number 805, the network node may transmit, and the UE may receive, configuration information. In some aspects, the UE may receive the configuration information via one or more of radio resource control (RRC) signaling, control information (DCI), among other examples. In some aspects, the configuration information may include an indication of one or more configuration parameters (e.g., already known to the UE and/or previously indicated by the network node or other network device) for selection by the UE, and/or explicit configuration information for the UE to use to configure the UE, among other examples.

In some aspects, the configuration information may indicate that the UE is to transmit a capabilities report that indicates a capability to transmit FDRSB correction information using measurements of an FDRSB training signal transmitted via multiple ports. In some aspects, the configuration information may indicate a pattern for different ports associated with the FDRSB training signal. For example, the configuration information may indicate densities of subcarriers that carrier the FDRSB training signal (e.g., 1/2 density so each subcarrier includes the FDRSB training signal or a mirror of an FDRSB training signal), lengths (e.g., numbers of consecutive subcarriers that are occupied in a pattern such as {1,1,0,0,1,1,0,0 . . . }, with 1 indicating occupied subcarriers and 0 indicating vacant subcarriers), among other examples.

The UE may configure itself based at least in part on the configuration information. In some aspects, the UE may be configured to perform one or more operations described herein based at least in part on the configuration information.

As shown by reference number 810, the UE may transmit, and the network node may receive, a capabilities report. In some aspects, the capabilities report may indicate UE support identifying FDRSB correction information using measurements of an FDRSB training signal transmitted via multiple ports.

As shown by reference number 815, the UE may transmit, and the network node may receive, a request for an allocation for receiving an FDRSB training signal.

As shown by reference number 820, the UE may receive, and the network node may transmit, a configuration for receiving the FDRSB training signal transmitted via multiple ports. The configuration may indicate a configuration of a first set of subcarriers and a second set of subcarriers that are to carry the FDRSB training signal. The first set of subcarriers may be below a center frequency (e.g., a carrier frequency) and the second set of subcarriers may be above the center frequency, with vacant subcarriers at locations that mirror the first set of subcarriers (e.g., above the center frequency and/or interleaved with the second set of subcarriers) and the second set of subcarriers (e.g., below the center frequency and/or interleaved with the first set of subcarriers).

The first set of subcarriers may include a first subset of subcarriers allocated to a first port of an associated network node and a second subset of subcarriers allocated to a second port of the associated network node. Similarly, the second set of subcarriers may include a third subset of subcarriers allocated to the first port and a fourth subset of subcarriers allocated to the second port of the associated network node. Additionally, or alternatively, first set of subcarriers and/or the second set of subcarriers may include additional subsets of subcarriers allocated to additional ports (e.g., a third subset of subcarriers allocated to a third port of the associated network node).

In some aspects, the third subset of subcarriers may be vacant based at least in part on the associated network node being configured to communicate with the UE via the first port and the second port, and being configured not to communicate with the UE via the third port. In this way, the first port and the second port may have a static allocation of subcarriers, regardless of whether the third subset is used for a third port.

For example, the configuration may indicate a periodicity of the FDRSB training signals and/or a pattern of ports used to transmit the FDRSB training signal. In some aspects, the configuration may indicate a static resolution of ports (e.g., a first port is allocated every eighth subcarrier regardless of a number of other ports used to transmit the FDRSB training signal) or a dynamic resolution of ports. For example, the FDRSB training signal may occupy every other subcarrier and occupied subcarriers may rotate through the ports used to transmit the FDRSB training signal (e.g., if only 2 ports are used, the first port and the second port may each have a resolution of every fourth subcarrier).

In some aspects, the configuration may indicate an allocation for the FDRSB training signal. For example, the configuration may indicate one or more time resources for receiving the FDRSB training signal. The one or more time resources may be referred to as FDRSB training symbols. In some aspects, the UE may receive the indication of the allocation and/or the configuration based at least in part on a change in temperature at the UE, a change in temperature at an associated network node, a precoding change for transmissions by the associated network node, a precoding change for transmissions by the UE, and/or an age of an update of the FDRSB correction, among other examples.

As shown by reference number 825, the UE may receive, and the network node may transmit, the FDRSB training signal on a first set of subcarriers and a second set of subcarriers, with a mirror of the first set of subcarriers being non-overlapping with the second set of subcarriers. In some aspects, the multi-port FDRSB training signal may include transmissions of the FDRSB signal transmitted via different ports on interleaved subcarriers. In some aspects, the first set of subcarriers may be lower than a carrier frequency and the second set of subcarriers may be higher than the carrier frequency.

In some aspects, the UE may receive the FDRSB training signal on one or more time resources (e.g., one or more slots and/or one or more symbols within a slot). In some aspects, a number of time resources used for the FDRSB training signal may be based at least in part on channel conditions (e.g., SNR, RSRP, taps, Doppler shift, among other examples). In some aspects, the UE may receive the FDRSB training signal based at least in part on a configured pattern of allocations of subcarriers to different ports and/or to vacancy (e.g., with vacant subcarriers mirroring non-vacant subcarriers about the center frequency and/or carrier frequency).

In some aspects, the indication of the FDRSB correction may include separate information elements for different ports. For example, the indication of FDRSB correction may include a first information element associated with the first port and a second information element associated with the second port. In this way, the network node may send different FDRSB correction information to different devices (RRHs, TRPs, and/or panels) based at least in part on association of the different devices to different ports.

As shown by reference number 830, the UE may identify FDRSB correction for multiple ports. The FDRSB correction may be based at least in part on the FDRSB training signal. In some aspects, the UE may receive one or more additional iterations of the FDRSB training signal, and the FDRSB correction may be based at least in part on the FDRSB training signal and the one or more additional iterations of the FDRSB training signal. In some aspects, the UE may receive, and the network node may transmit, the one or more additional iterations of the FDRSB training signal based at least in part on an associated channel having an SNR that fails to satisfy a threshold.

In some aspects, the UE may measure FDRSB on vacant subcarriers and associate the measured FDRSB on a particular vacant subcarrier with a mirrored subcarrier. In some aspects, the UE may interpolate network node FDRSB correction information (e.g., for subcarriers on which the UE did not measure FDRSB for a particular port) associated with the first set of subcarriers and/or associated with the second set of subcarriers. For example, if the UE measured FDRSB for the first port on subcarriers { . . . −34, −26, −18, −10, −2, 1, 9, 17, 25, 33 . . . }, the UE may interpolate FDRSB on subcarriers between the measured subcarriers. In some aspects, the UE may provide the measurements of the FDRSB and the network node may interpolate the FDRSB on the subcarriers between the measured subcarriers.

As shown by reference number 835, the UE may transmit, and the network node may receive, an indication of the FDRSB correction (e.g., correction information) for the multiple ports. The indication of the FDRSB correction may be based at least in part on the FDRSB training signal and/or one or more iterations of the FDRSB training signal. In some aspects, the indication of the FDRSB correction includes information elements associated with individual subcarriers of the first set of subcarriers and/or information elements associated with individual subcarriers of the second set of subcarriers. In some aspects, the indication of the FDRSB correction comprises elements of a matrix that indicates the FDRSB at associated subcarriers.

As shown by reference number 840, the network node may apply FDRSB correction.

As shown by reference number 845, the UE may receive, and the network node may transmit, a communication having FDRSB correction applied. In some aspects, the communication may have a reduced FDRSB, which may reduce an error rate of the communication. In some aspects, the communication may have an increased MCS or other parameter associated with increased spectral efficiency based at least in part on the communication having FDRSB correction applied.

As indicated above, FIG. 8 is provided as an example. Other examples may differ from what is described with respect to FIG. 8.

Figure 9:
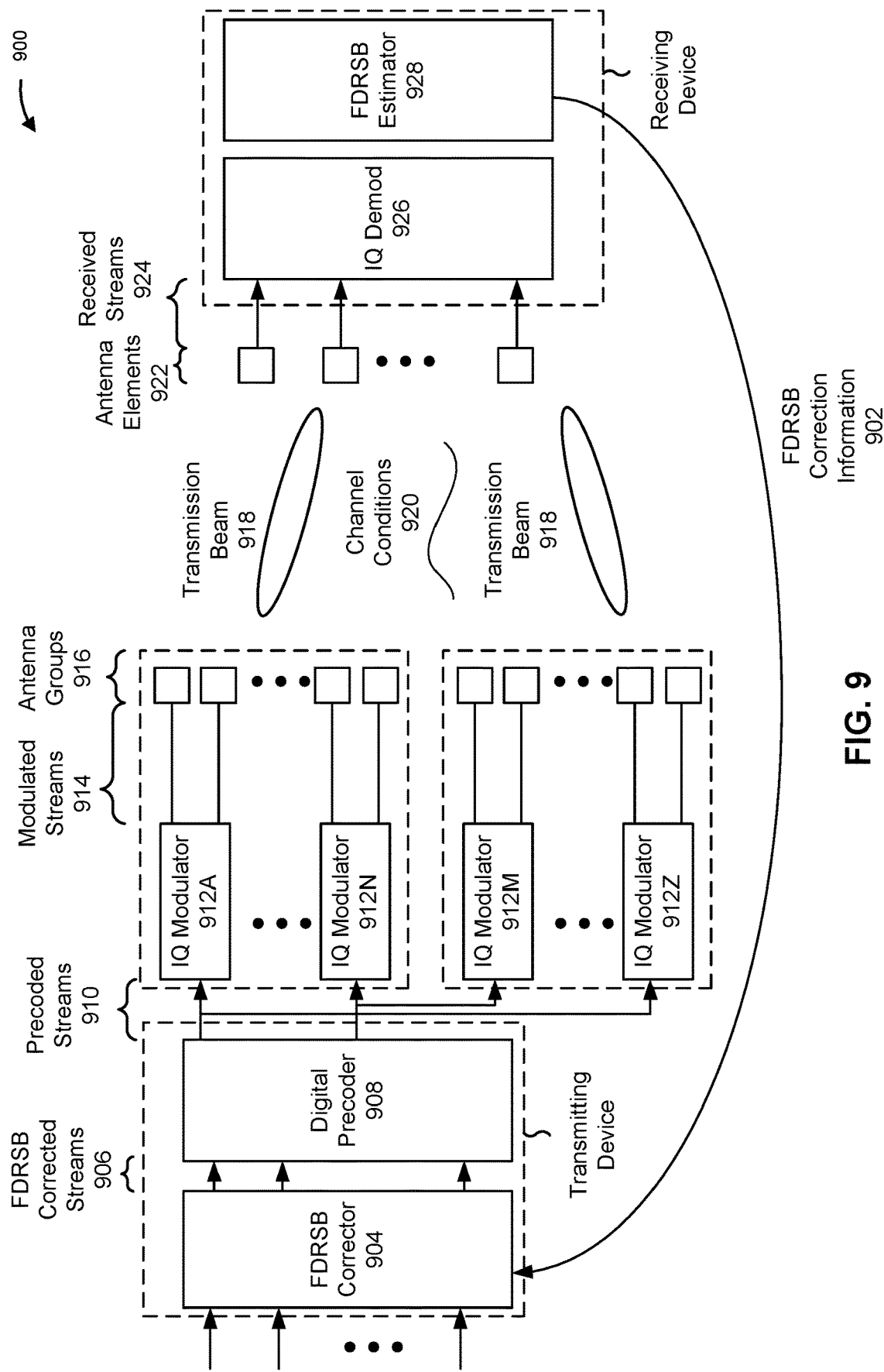
FIG. 9 is a diagram illustrating an example of a communication having FDRSB, in accordance with the present disclosure.

FIG. 9 is a diagram illustrating an example 900 of a communication having FDRSB, in accordance with the present disclosure. As shown in FIG. 9, a transmitting device (e.g., a network node) may transmit a communication to a receiving device (e.g., a UE). The transmitting device may use multiple antenna element groups to transmit the communication using beamforming. The multiple antenna groups may be associated with different TRPs and/or RRHs. The communication may include signals transmitted via multiple time-frequency resources (e.g., via multiple subcarriers and/or resource blocks on one or more symbols and/or slots). The communication may include an FDRSB training signal and/or one or more streams of data, among other examples.

As shown in FIG. 9, the receiving device may transmit FDRSB correction information 902 to the transmitting device. In some aspects, the receiving device may obtain the FDRSB correction information 902 based at least in part on receiving an FDRSB training signal, such as described in connection with FIGS. 7-8. The FDRSB correction information 902 may include a set of information elements that are associated with different antenna groups used by the transmitting device to transmit to the receiving device.

As shown in FIG. 9, the transmitting device may receive the FDRSB correction information 902 and provide the FDRSB correction information 902 to an FDRSB corrector 904. The transmitting device may transmit the FDRSB correction information 902 via one or more intermediary devices, such as RRHs, TRPs, and/or RUs, among other examples. The FDRSB corrector 904 may apply FDRSB correction to streams for transmission to the receiving device. For example, the FDRSB corrector 904 may apply individual (e.g., allowed to be different) FDRSB correction for each port and/or for each IQ modulator used to transmit to the receiving device.

The FDRSB corrector 904 may provide FDRSB corrected streams 906 to a digital precoder 908. After applying a digital precoding to support beam forming, the digital precoder 908 may provide precoded streams 910 to IQ modulators 912 (e.g., IQ modulators 912A through 912N). The IQ modulators 912 may modulate the precoded streams 910 to map bits of the precoded streams 910 to constellation points associated with bit values of the precoded streams 910. For example, the IQ modulators 912 may apply modulation based at least in part on applying amplitudes, in a Q dimension and an I dimension in an IQ plane, according to an MCS of communications to the receiving device. The IQ modulators 912 may be located on different transmitters associated with the transmitting device. For example, the different transmitters may be RRHs and/or TRPs that are at different locations. The different transmitters may use different beams and/or different channels to communicate with the receiving device.

The IQ modulators 912 may cause FDRSB (e.g., an IQ mismatch, an FDRSB impairment, and/or FDRSB error) to the precoded streams 910 based at least in part on, for example, imperfections of the IQ modulators 912. However, the FDRSB may be preemptively corrected using the FDRSB corrector 904.

The IQ modulators 912 may provide modulated streams 914 to antenna groups 916 for transmission over the air to the receiving device. Based at least in part on precoding, the antenna groups 916 may transmit the modulated streams via transmission beams 918. As the modulated signals of the modulated streams propagate over the air to the receiving device, channel conditions 920 may affect the modulated streams. For example, the channel conditions 920 may affect an SNR and/or an SINR of the modulated signals as received at the receiving device.

The receiving device may use one or more antenna elements 922 to receive the modulated streams 914 having effects from channel conditions 920. Received streams 924 (e.g., the modulated signals having effects of channel conditions 920) may be provided to an IQ demodulator (IQ demod) 926. The IQ demodulator 926 may demodulate the received streams 924 and may provide the demodulated streams for decoding and reception of data from the streams.

In some aspects, the streams may include FDRSB training signals to update the FDRSB correction information 902. In this case, the receiving device may provide the received streams (e.g., a portion of the received streams that include the FDRSB training signal) to an FDRSB estimator 928. The FDRSB estimator 928 may use the FDRSB training signal (e.g., configured as described herein) to identify an update to the FDRSB correction information 902.

As indicated above, FIG. 9 is provided as an example. Other examples may differ from what is described with regard to FIG. 9.

Figure 10:
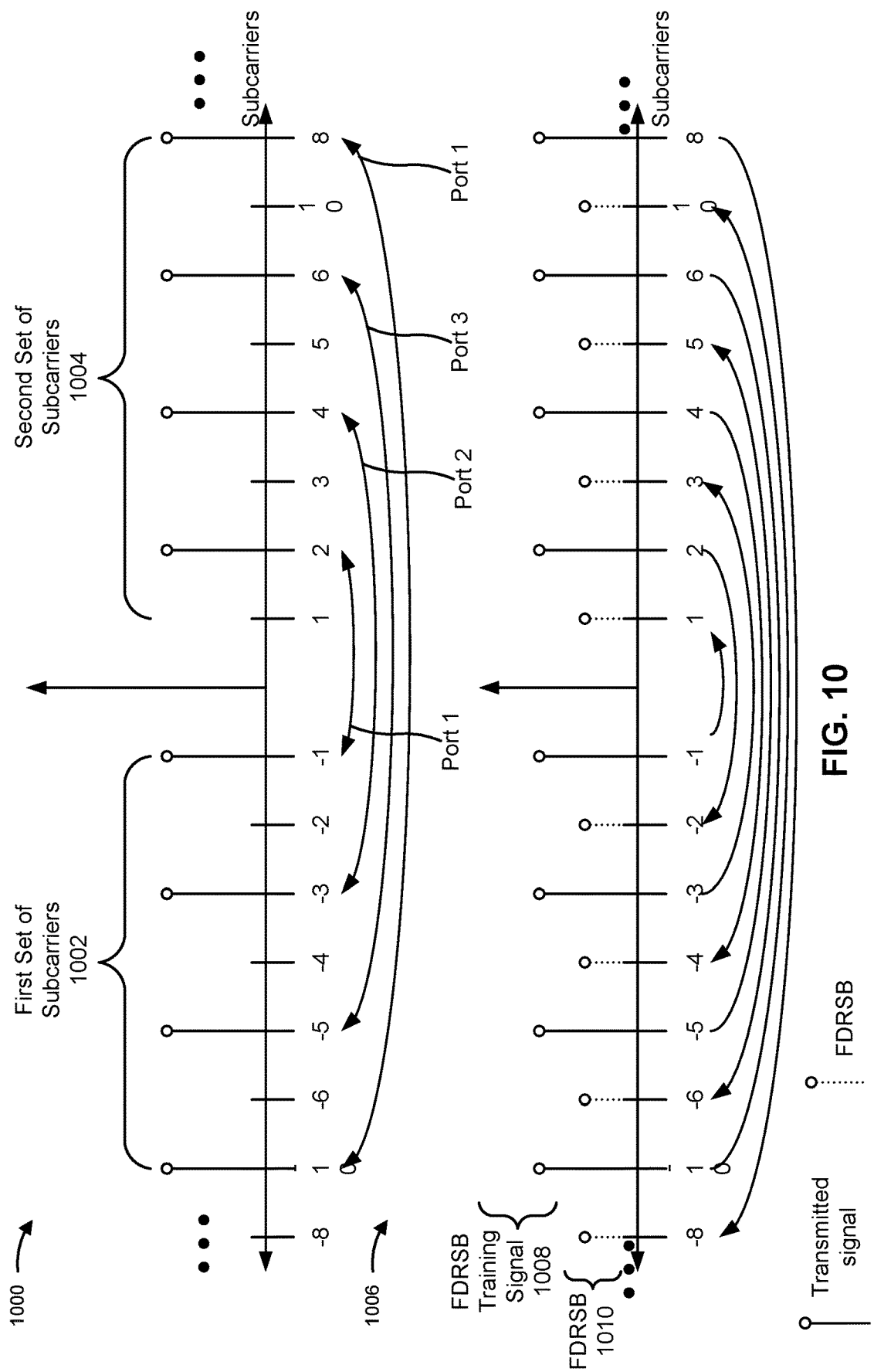
FIG. 10 is a diagram illustrating an example of an FDRSB training signal, in accordance with the present disclosure.

FIG. 10 is a diagram illustrating an example 1000 of an FDRSB training signal, in accordance with the present disclosure. As shown in FIG. 10, a transmitting device (e.g., a network node) may transmit an FDRSB training signal to a receiving device (e.g., a UE). The transmitting device may use multiple antenna element groups to transmit the FDRSB training signal using beamforming. The multiple antenna groups may be associated with different TRPs and/or RRHs. The FDRSB training signal may include signals transmitted via multiple time-frequency resources (e.g., via multiple subcarriers and/or resource blocks on one or more symbols and/or slots).

As shown by reference number 1002, the FDRSB training signal may include a first set of subcarriers 1002 that are below a center frequency (e.g., a carrier frequency) and a second set of subcarriers 1004 that are above the center frequency. The first set of subcarriers 1002 and the second set of subcarriers 1004 may include subcarriers that do not overlap with a subcarrier that carries the FDRSB training signal (e.g., subcarriers that mirror the first set of subcarriers do not overlap with the second set of subcarriers, and subcarriers that mirror the second set of subcarriers do not overlap with the first set of subcarriers).

The first set of subcarriers 1002 and the second set of subcarriers 1004 also include subcarriers allocated to a set of ports (e.g., shown as ports 1, 2, and 3). Each port may have subcarriers allocated in both of the first set of subcarriers 1002 and the second set of subcarriers 1004. In some aspects, the subcarriers may be allocated to interleave subcarriers of different ports. For example, a pattern of allocated subcarriers (e.g., skipping vacant subcarriers) may be 1, 2, 3, 1, 2, 3, 1, 2, 3 . . . such that sequential occupied subcarriers cycle through the different ports.

As shown by reference number 1006, occupied subcarriers may cause FDRSB on mirrored subcarriers. For example, an FDRSB training signal 1008 may cause FDRSB 1010 on subcarriers that mirror subcarriers that are allocated for the FDRSB training signal 1008. As shown in FIG. 10, an FDRSB training signal 1008 at subcarrier −1 causes FDRSB at subcarrier 1, an FDRSB training signal 1008 at subcarrier 2 causes FDRSB at subcarrier −2, an FDRSB training signal 1008 at subcarrier −3 causes FDRSB at subcarrier 3, an FDRSB training signal 1008 at subcarrier 4 causes FDRSB at subcarrier −4, etc.

Based at least in part on the mirror subcarriers being vacant (e.g., not allocated for transmission of the FDRSB training signal 1008), the UE may measure the FDRSB isolated from the FDRSB training signal 1008. Additionally, or alternatively, the UE may separately measure the FDRSB for different ports based at least in part on the ports being allocated on non-overlapping subcarriers.

As indicated above, FIG. 10 is provided as an example. Other examples may differ from what is described with respect to FIG. 10.

Figure 11:
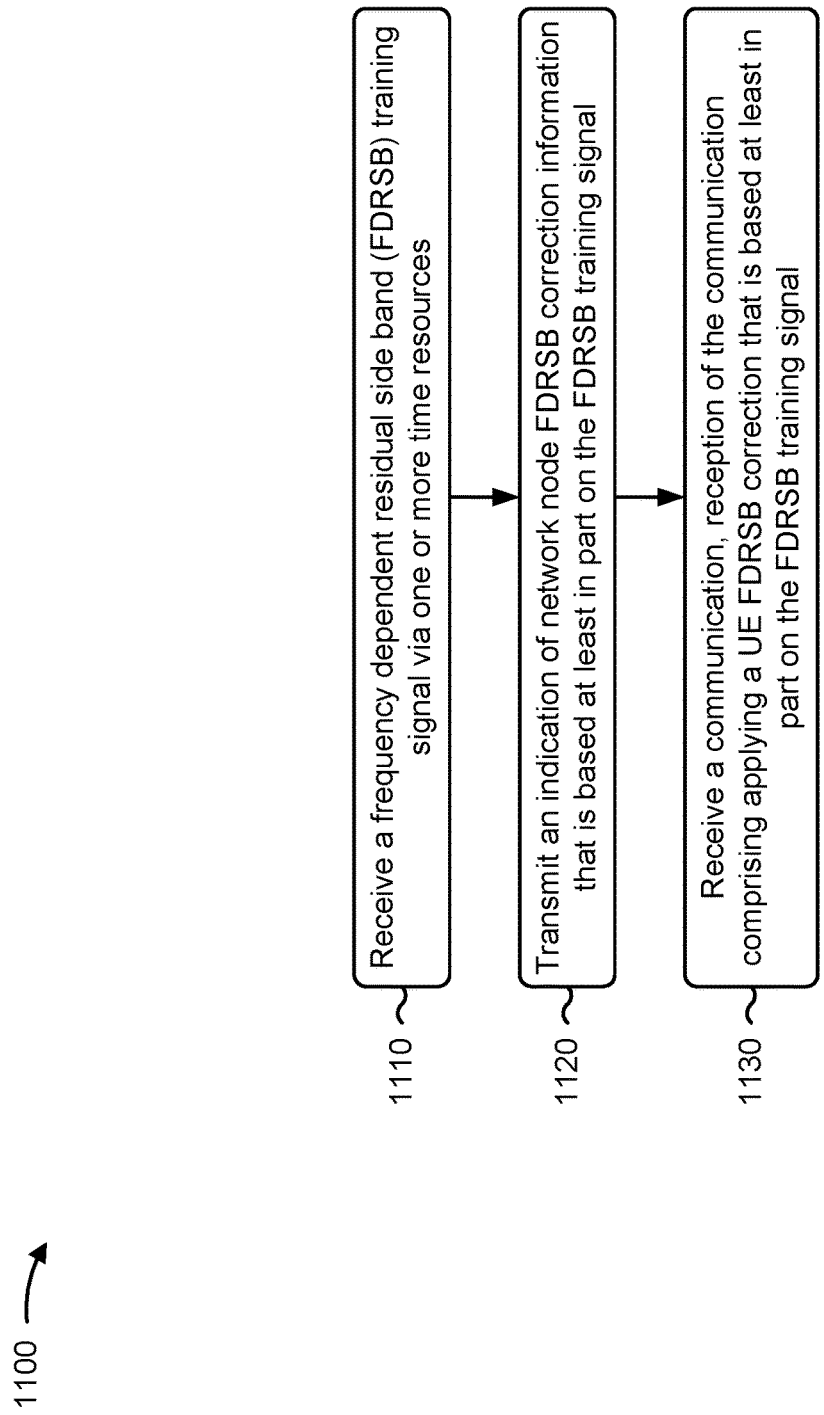
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with FDRSB training signals.

As shown in FIG. 11, in some aspects, process 1100 may include receiving an FDRSB training signal via one or more time resources (block 1110). For example, the UE (e.g., using reception component 1402 and/or communication manager 1408, depicted in FIG. 14) may receive an FDRSB training signal via one or more time resources, as described above.

As further shown in FIG. 11, in some aspects, process 1100 may include transmitting an indication of network node FDRSB correction information that is based at least in part on the FDRSB training signal (block 1120). For example, the UE (e.g., using transmission component 1404 and/or communication manager 1408, depicted in FIG. 14) may transmit an indication of network node FDRSB correction information that is based at least in part on the FDRSB training signal, as described above.

As further shown in FIG. 11, in some aspects, process 1100 may include receiving a communication, reception of the communication comprising applying a UE FDRSB correction that is based at least in part on the FDRSB training signal (block 1130). For example, the UE (e.g., using reception component 1402 and/or communication manager 1408, depicted in FIG. 14) may receive a communication, reception of the communication comprising applying a UE FDRSB correction that is based at least in part on the FDRSB training signal, as described above.

Process 1100 may include additional aspects, such as any single aspect or any combination of aspects described below and/or in connection with one or more other processes described elsewhere herein.

In a first aspect, receiving the FDRSB training signal via one or more time resources comprises receiving a first portion of the FDRSB training signal via a first time resource and using a first phase shift, and receiving a second portion of the FDRSB training signal via a second time resource and using a second phase shift that is different from the first phase shift.

In a second aspect, alone or in combination with the first aspect, the first phase shift and the second phase shift are out of phase by approximately 90 degrees.

In a third aspect, alone or in combination with one or more of the first and second aspects, the UE FDRSB correction is based at least in part on a difference in measurements of the FDRSB training signal during the first time resource and measurements of the FDRSB training signal during the second time resource.

In a fourth aspect, alone or in combination with one or more of the first through third aspects, receiving the FDRSB training signal via one or more time resources comprises receiving a first portion of the FDRSB training signal via a first time resource, the first portion including the FDRSB training signal on a first set of subcarriers that are lower than a carrier frequency and on a second set of subcarriers that are higher than the carrier frequency, wherein a mirror of the first set of subcarriers about the carrier frequency is non-overlapping with the second set of subcarriers.

In a fifth aspect, alone or in combination with one or more of the first through fourth aspects, receiving the FDRSB training signal via one or more time resources comprises receiving a second portion of the FDRSB training signal via a second time resource, the second portion including the FDRSB training signal on a third set of subcarriers that are lower than the carrier frequency and on a fourth set of subcarriers that are higher than the carrier frequency, wherein a mirror of the third set of subcarriers about the carrier frequency is non-overlapping with the fourth set of subcarriers.

In a sixth aspect, alone or in combination with one or more of the first through fifth aspects, the mirror of the first set of subcarriers comprises the third set of subcarriers, a mirror of the second set of subcarriers comprises the fourth set of subcarriers, the mirror of the third set of subcarriers comprises the first set of subcarriers, or a mirror of the fourth set of subcarriers comprises the second set of subcarriers.

In a seventh aspect, alone or in combination with one or more of the first through sixth aspects, process 1100 includes one or more of interpolating network node FDRSB correction information associated with the first set of subcarriers, interpolating network node FDRSB correction information associated with the second set of subcarriers, interpolating UE FDRSB correction information associated with the first set of subcarriers, or interpolating UE FDRSB correction information associated with the second set of subcarriers.

In an eighth aspect, alone or in combination with one or more of the first through seventh aspects, process 1100 includes receiving an indication of an allocation of the one or more time resources for reception of the FDRSB training signal.

In a ninth aspect, alone or in combination with one or more of the first through eighth aspects, reception of the indication of the allocation is based at least in part on one or more of a request from the UE, a change in temperature, a change in precoding used for communications between the UE and a network node, a periodicity of the FDRSB training signal, or an amount of time from a most recent FDRSB training signal.

In a tenth aspect, alone or in combination with one or more of the first through ninth aspects, the FDRSB training signal spans a bandwidth that is based at least in part on an operating bandwidth of a network node.

In an eleventh aspect, alone or in combination with one or more of the first through tenth aspects, the communication has network node FDRSB correction applied based at least in part on the indication of the network node FDRSB correction information.

In a twelfth aspect, alone or in combination with one or more of the first through eleventh aspects, process 1100 includes receiving an additional iteration of the FDRSB training signal, wherein the indication of the network node FDRSB correction information is based at least in part on the additional iteration of the FDRSB training signal.

In a thirteenth aspect, alone or in combination with one or more of the first through twelfth aspects, reception of the additional iteration of the FDRSB training signal is based at least in part on an associated channel having an SNR that fails to satisfy a threshold.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
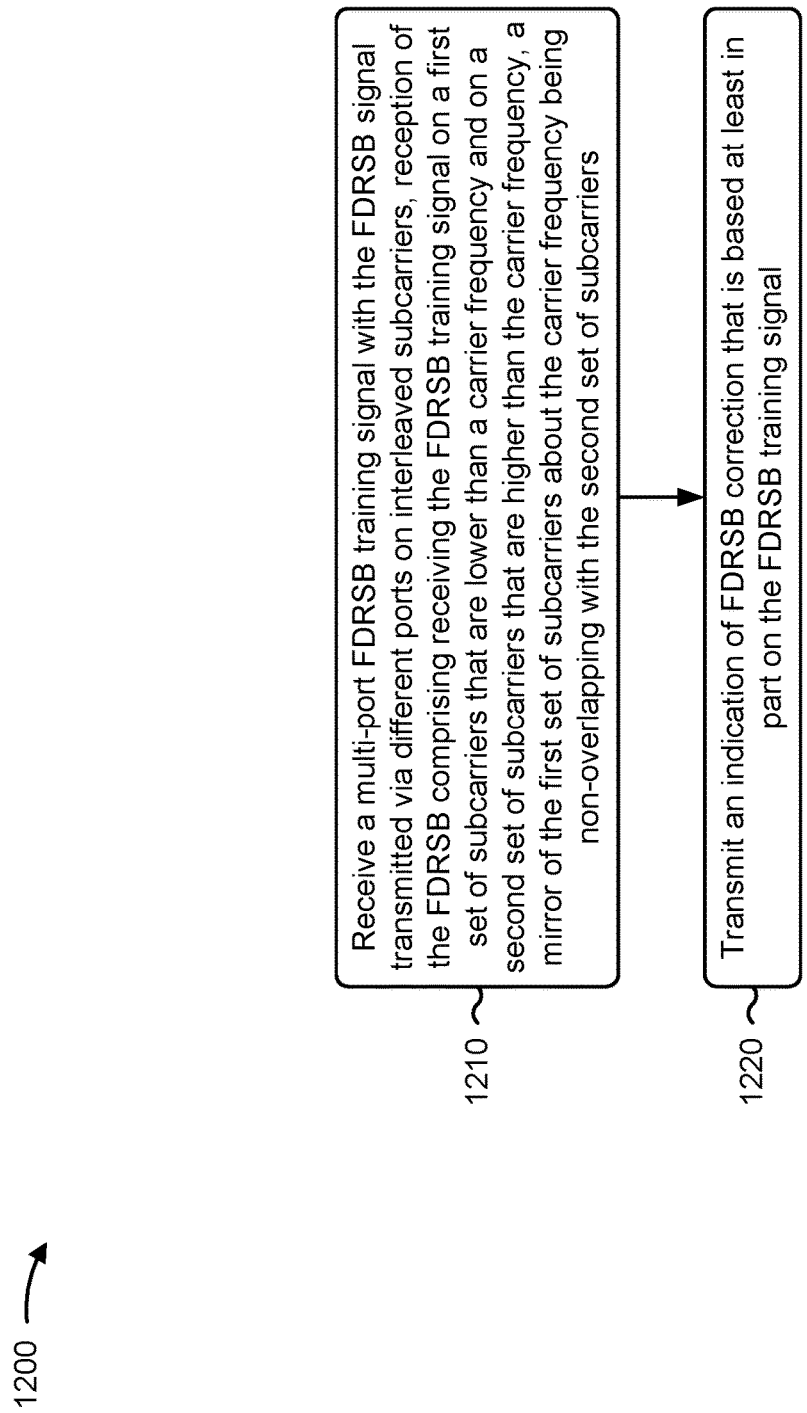
FIG. 12 is a diagram illustrating an example process performed, for example, by a UE, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with FDRSB training signals.

As shown in FIG. 12, in some aspects, process 1200 may include receiving a multi-port FDRSB training signal with the FDRSB signal transmitted via different ports on interleaved subcarriers, reception of the FDRSB comprising receiving the FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers (block 1210). For example, the UE (e.g., using reception component 1402 and/or communication manager 1408, depicted in FIG. 14) may receive a multi-port FDRSB training signal with the FDRSB signal transmitted via different ports on interleaved subcarriers, reception of the FDRSB comprising receiving the FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers, as described above.

As further shown in FIG. 12, in some aspects, process 1200 may include transmitting an indication of FDRSB correction that is based at least in part on the FDRSB training signal (block 1220). For example, the UE (e.g., using transmission component 1404 and/or communication manager 1408, depicted in FIG. 14) may transmit an indication of FDRSB correction that is based at least in part on the FDRSB training signal, as described above.

Process 1200 may include additional aspects, such as any single aspect or any combination of aspects described below and/or in connection with one or more other processes described elsewhere herein.

In a first aspect, process 1200 includes receiving an additional iteration of the FDRSB training signal, wherein the indication of the FDRSB correction is based at least in part on the additional iteration of the FDRSB training signal.

In a second aspect, alone or in combination with the first aspect, reception of the additional iteration of the FDRSB training signal is based at least in part on an associated channel having an SNR that fails to satisfy a threshold.

In a third aspect, alone or in combination with one or more of the first and second aspects, process 1200 includes receiving an indication of a configuration of the first set of subcarriers and the second set of subcarriers.

In a fourth aspect, alone or in combination with one or more of the first through third aspects, the first set of subcarriers comprises a first subset of subcarriers allocated to a first port of an associated network node, and the first set of subcarriers comprises a second subset of subcarriers allocated to a second port of the associated network node.

In a fifth aspect, alone or in combination with one or more of the first through fourth aspects, the first set of subcarriers comprises a third subset of subcarriers allocated to a third port of the associated network node.

In a sixth aspect, alone or in combination with one or more of the first through fifth aspects, the third subset of subcarriers are vacant based at least in part on the associated network node being configured to communicate with the UE via the first port and the second port, and being configured not to communicate with the UE via the third port.

In a seventh aspect, alone or in combination with one or more of the first through sixth aspects, the indication of FDRSB correction includes a first information element associated with the first port and a second information element associated with the second port.

In an eighth aspect, alone or in combination with one or more of the first through seventh aspects, process 1200 includes one or more of interpolating FDRSB correction information associated with the first set of subcarriers, or interpolating network node FDRSB correction information associated with the second set of subcarriers.

In a ninth aspect, alone or in combination with one or more of the first through eighth aspects, the indication of the FDRSB correction comprises information elements associated with individual subcarriers of the first set of subcarriers, or information elements associated with individual subcarriers of the second set of subcarriers.

In a tenth aspect, alone or in combination with one or more of the first through ninth aspects, process 1200 includes receiving an indication of an allocation for the FDRSB training signal.

In an eleventh aspect, alone or in combination with one or more of the first through tenth aspects, reception of the indication of the allocation for the FDRSB training signal is based at least in part on one or more of a change in temperature at the UE, a change in temperature at an associated network node, a precoding change for transmissions by the associated network node, a precoding change for transmissions by the UE, or an age of an update of the FDRSB correction.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
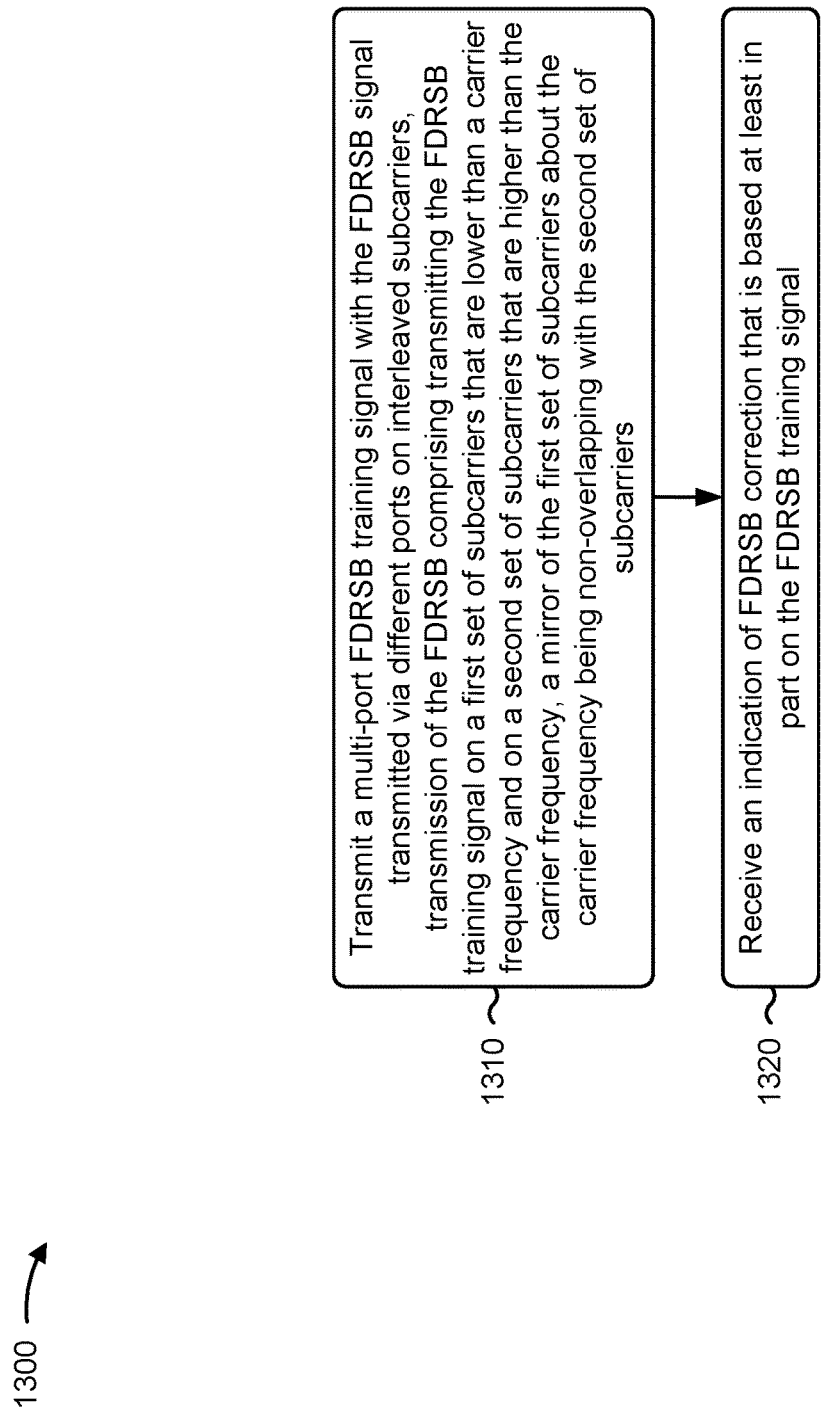
FIG. 13 is a diagram illustrating an example process performed, for example, by a network node, in accordance with the present disclosure.

FIG. 13 is a diagram illustrating an example process 1300 performed, for example, by a network node, in accordance with the present disclosure. Example process 1300 is an example where the network node (e.g., network node 110) performs operations associated with FDRSB training signals.

As shown in FIG. 13, in some aspects, process 1300 may include transmitting a multi-port FDRSB training signal with the FDRSB signal transmitted via different ports on interleaved subcarriers, transmission of the FDRSB comprising transmitting the FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers (block 1310). For example, the network node (e.g., using transmission component 1504 and/or communication manager 1508, depicted in FIG. 15) may transmit a multi-port FDRSB training signal with the FDRSB signal transmitted via different ports on interleaved subcarriers, transmission of the FDRSB comprising transmitting the FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers, as described above.

As further shown in FIG. 13, in some aspects, process 1300 may include receiving an indication of FDRSB correction that is based at least in part on the FDRSB training signal (block 1320). For example, the network node (e.g., using reception component 1502 and/or communication manager 1508, depicted in FIG. 15) may receive an indication of FDRSB correction that is based at least in part on the FDRSB training signal, as described above.

Process 1300 may include additional aspects, such as any single aspect or any combination of aspects described below and/or in connection with one or more other processes described elsewhere herein.

In a first aspect, process 1300 includes transmitting an additional iteration of the FDRSB training signal, wherein the indication of the FDRSB correction is based at least in part on the additional iteration of the FDRSB training signal.

In a second aspect, alone or in combination with the first aspect, transmission of the additional iteration of the FDRSB training signal is based at least in part on an associated channel having an SNR that fails to satisfy a threshold.

In a third aspect, alone or in combination with one or more of the first and second aspects, process 1300 includes transmitting an indication of a configuration of the first set of subcarriers and the second set of subcarriers.

In a fourth aspect, alone or in combination with one or more of the first through third aspects, the first set of subcarriers comprises a first subset of subcarriers allocated to a first port of the network node, and the first set of subcarriers comprises a second subset of subcarriers allocated to a second port of the network node.

In a fifth aspect, alone or in combination with one or more of the first through fourth aspects, the first set of subcarriers comprises a third subset of subcarriers allocated to a third port of the network node.

In a sixth aspect, alone or in combination with one or more of the first through fifth aspects, the third subset of subcarriers are vacant based at least in part on the network node being configured to communicate with a UE via the first port and the second port, and being configured not to communicate with the UE via the third port.

In a seventh aspect, alone or in combination with one or more of the first through sixth aspects, the indication of FDRSB correction includes a first information element associated with the first port and a second information element associated with the second port.

In an eighth aspect, alone or in combination with one or more of the first through seventh aspects, the indication of the FDRSB correction comprises information elements associated with individual subcarriers of the first set of subcarriers, or information elements associated with individual subcarriers of the second set of subcarriers.

In a ninth aspect, alone or in combination with one or more of the first through eighth aspects, process 1300 includes transmitting an indication of an allocation for the FDRSB training signal.

In a tenth aspect, alone or in combination with one or more of the first through ninth aspects, transmission of the indication of the allocation for the FDRSB training signal is based at least in part on one or more of a change in temperature at a UE, a change in temperature at an network node, a precoding change for transmissions by the network node, a precoding change for transmissions by the UE, or an age of an update of the FDRSB correction.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
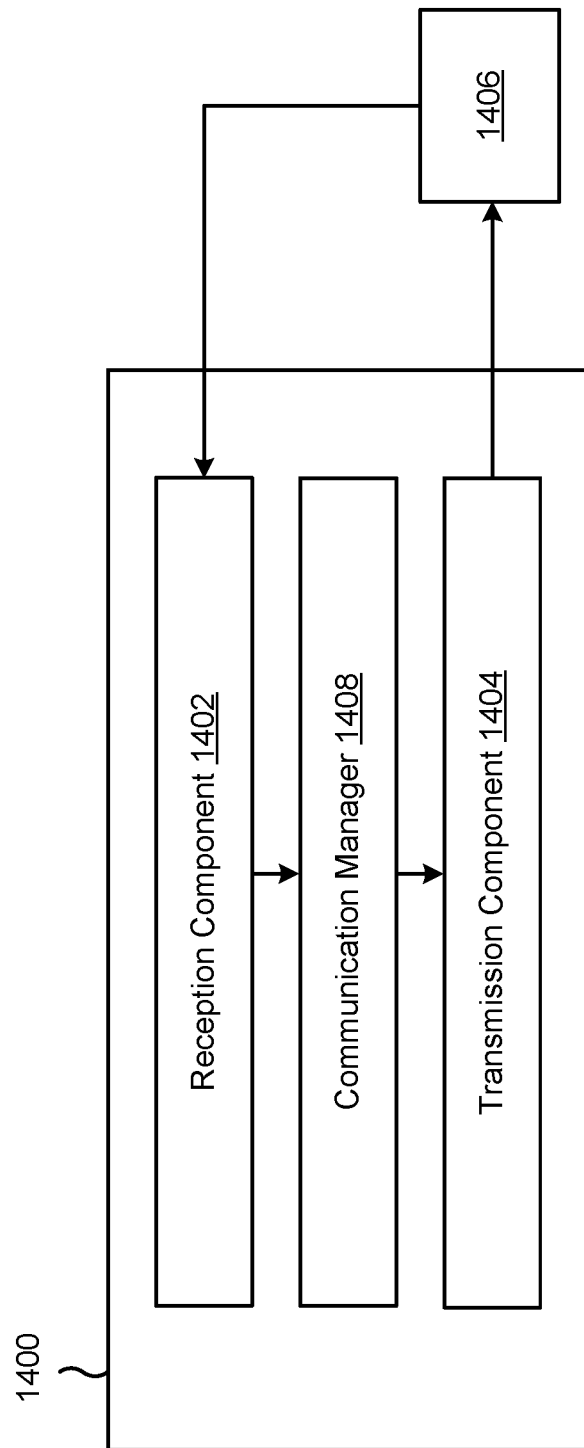
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a UE, or a UE may include the apparatus 1400. In some aspects, the apparatus 1400 includes a reception component 1402, a transmission component 1404, and/or a communication manager 1408, which may be in communication with one another (for example, via one or more buses and/or one or more other components). In some aspects, the communication manager 1408 is the communication manager 140 described in connection with FIG. 1. As shown, the apparatus 1400 may communicate with another apparatus 1406, such as a UE or a network node (such as a CU, a DU, an RU, or a base station), using the reception component 1402 and the transmission component 1404.

In some aspects, the apparatus 1400 may be configured to perform one or more operations described herein in connection with FIGS. 5-10. Additionally, or alternatively, the apparatus 1400 may be configured to perform one or more processes described herein, such as process 1100 of FIG. 11, process 1200 of FIG. 12, or a combination thereof. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The communication manager 1408 may support operations of the reception component 1402 and/or the transmission component 1404. For example, the communication manager 1408 may receive information associated with configuring reception of communications by the reception component 1402 and/or transmission of communications by the transmission component 1404. Additionally, or alternatively, the communication manager 1408 may generate and/or provide control information to the reception component 1402 and/or the transmission component 1404 to control reception and/or transmission of communications.

The reception component 1402 may receive an FDRSB training signal via one or more time resources. The transmission component 1404 may transmit an indication of network node FDRSB correction information that is based at least in part on the FDRSB training signal. The reception component 1402 may receive a communication, reception of the communication comprising applying a UE FDRSB correction that is based at least in part on the FDRSB training signal.

The reception component 1402 may receive an indication of an allocation of the one or more time resources for reception of the FDRSB training signal.

The reception component 1402 may receive an additional iteration of the FDRSB training signal, wherein the indication of the network node FDRSB correction information is based at least in part on the additional iteration of the FDRSB training signal.

The reception component 1402 may receive a multi-port FDRSB training signal with the FDRSB signal transmitted via different ports on interleaved subcarriers, reception of the FDRSB comprising receiving the FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers. The transmission component 1404 may transmit an indication of FDRSB correction that is based at least in part on the FDRSB training signal.

The reception component 1402 may receive an additional iteration of the FDRSB training signal, wherein the indication of the FDRSB correction is based at least in part on the additional iteration of the FDRSB training signal.

The reception component 1402 may receive an indication of a configuration of the first set of subcarriers and the second set of subcarriers.

The reception component 1402 may receive an indication of an allocation for the FDRSB training signal.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
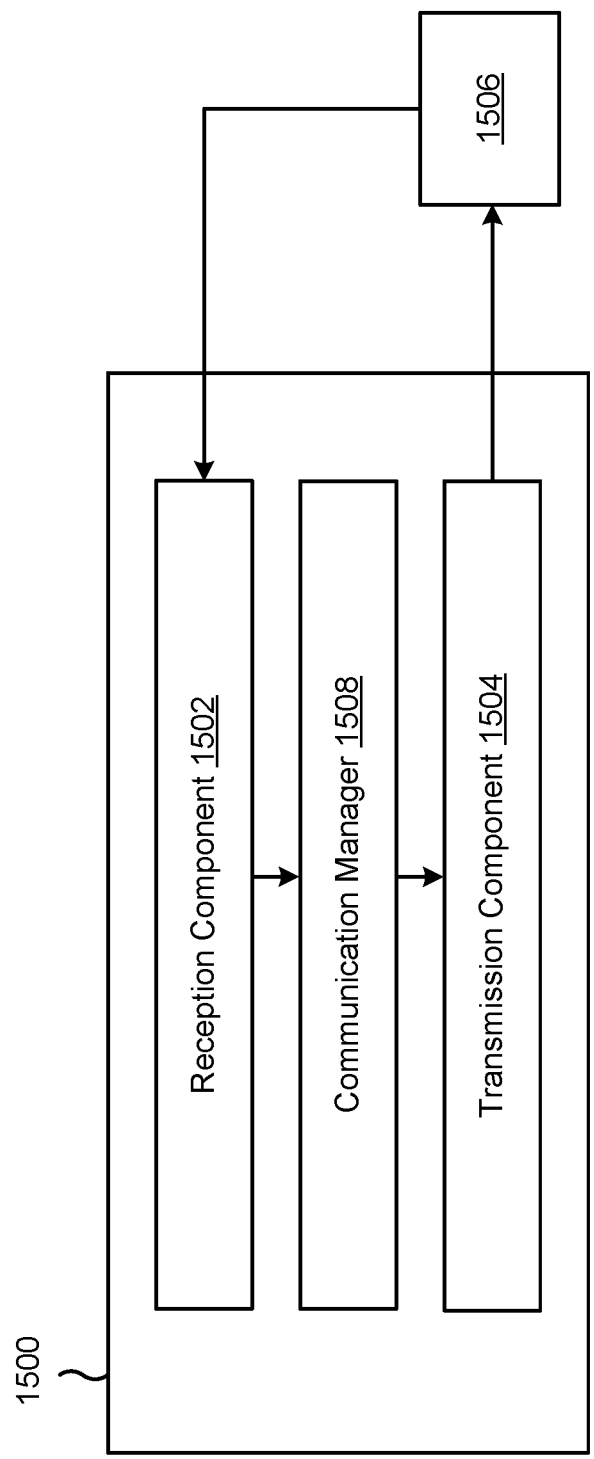
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a network node, or a network node may include the apparatus 1500. In some aspects, the apparatus 1500 includes a reception component 1502, a transmission component 1504, and/or a communication manager 1508, which may be in communication with one another (for example, via one or more buses and/or one or more other components). In some aspects, the communication manager 1508 is the communication manager 150 described in connection with FIG. 1. As shown, the apparatus 1500 may communicate with another apparatus 1506, such as a UE or a network node (such as a CU, a DU, an RU, or a base station), using the reception component 1502 and the transmission component 1504.

In some aspects, the apparatus 1500 may be configured to perform one or more operations described herein in connection with FIGS. 5-10. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the network node described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the network node described in connection with FIG. 2. In some aspects, the reception component 1502 and/or the transmission component 1504 may include or may be included in a network interface. The network interface may be configured to obtain and/or output signals for the apparatus 1500 via one or more communications links, such as a backhaul link, a midhaul link, and/or a fronthaul link.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the network node described in connection with FIG. 2. In some aspects, the transmission component 1504 may be co-located with the reception component 1502 in a transceiver.

The communication manager 1508 may support operations of the reception component 1502 and/or the transmission component 1504. For example, the communication manager 1508 may receive information associated with configuring reception of communications by the reception component 1502 and/or transmission of communications by the transmission component 1504. Additionally, or alternatively, the communication manager 1508 may generate and/or provide control information to the reception component 1502 and/or the transmission component 1504 to control reception and/or transmission of communications.

The transmission component 1504 may transmit a multi-port FDRSB training signal with the FDRSB signal transmitted via different ports on interleaved subcarriers, transmission of the FDRSB comprising transmitting the FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers. The reception component 1502 may receive an indication of FDRSB correction that is based at least in part on the FDRSB training signal.

The transmission component 1504 may transmit an additional iteration of the FDRSB training signal, wherein the indication of the FDRSB correction is based at least in part on the additional iteration of the FDRSB training signal.

The transmission component 1504 may transmit an indication of a configuration of the first set of subcarriers and the second set of subcarriers.

The transmission component 1504 may transmit an indication of an allocation for the FDRSB training signal.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a user equipment (UE), comprising: receiving a frequency dependent residual side band (FDRSB) training signal via one or more time resources; transmitting an indication of network node FDRSB correction information that is based at least in part on the FDRSB training signal; and receiving a communication, reception of the communication comprising applying a UE FDRSB correction that is based at least in part on the FDRSB training signal.

Aspect 2: The method of Aspect 1, wherein receiving the FDRSB training signal via one or more time resources comprises: receiving a first portion of the FDRSB training signal via a first time resource and using a first phase shift; and receiving a second portion of the FDRSB training signal via a second time resource and using a second phase shift that is different from the first phase shift.

Aspect 3: The method of Aspect 2, wherein the first phase shift and the second phase shift are out of phase by approximately 90 degrees.

Aspect 4: The method of Aspect 2, wherein the UE FDRSB correction is based at least in part on a difference in measurements of the FDRSB training signal during the first time resource and measurements of the FDRSB training signal during the second time resource.

Aspect 5: The method of any of Aspects 1-4, wherein receiving the FDRSB training signal via one or more time resources comprises: receiving a first portion of the FDRSB training signal via a first time resource, the first portion including the FDRSB training signal on a first set of subcarriers that are lower than a carrier frequency and on a second set of subcarriers that are higher than the carrier frequency, wherein a mirror of the first set of subcarriers about the carrier frequency is non-overlapping with the second set of subcarriers.

Aspect 6: The method of Aspect 5, wherein receiving the FDRSB training signal via one or more time resources comprises: receiving a second portion of the FDRSB training signal via a second time resource, the second portion including the FDRSB training signal on a third set of subcarriers that are lower than the carrier frequency and on a fourth set of subcarriers that are higher than the carrier frequency, wherein a mirror of the third set of subcarriers about the carrier frequency is non-overlapping with the fourth set of subcarriers.

Aspect 7: The method of Aspect 6, wherein the mirror of the first set of subcarriers comprises the third set of subcarriers, wherein a mirror of the second set of subcarriers comprises the fourth set of subcarriers, wherein the mirror of the third set of subcarriers comprises the first set of subcarriers, or wherein a mirror of the fourth set of subcarriers comprises the second set of subcarriers.

Aspect 8: The method of Aspect 5, further comprising one or more of: interpolating network node FDRSB correction information associated with the first set of subcarriers; interpolating network node FDRSB correction information associated with the second set of subcarriers; interpolating UE FDRSB correction information associated with the first set of subcarriers; or interpolating UE FDRSB correction information associated with the second set of subcarriers.

Aspect 9: The method of any of Aspects 1-8, further comprising: receiving an indication of an allocation of the one or more time resources for reception of the FDRSB training signal.

Aspect 10: The method of Aspect 9, wherein reception of the indication of the allocation is based at least in part on one or more of: a request from the UE, a change in temperature, a change in precoding used for communications between the UE and a network node, a periodicity of the FDRSB training signal, or an amount of time from a most recent FDRSB training signal.

Aspect 11: The method of any of Aspects 1-10, wherein the FDRSB training signal spans a bandwidth that is based at least in part on an operating bandwidth of a network node.

Aspect 12: The method of any of Aspects 1-11, wherein the communication has network node FDRSB correction applied based at least in part on the indication of the network node FDRSB correction information.

Aspect 13: The method of any of Aspects 1-12, further comprising receiving an additional iteration of the FDRSB training signal, wherein the indication of the network node FDRSB correction information is based at least in part on the additional iteration of the FDRSB training signal.

Aspect 14: The method of Aspect 13, wherein reception of the additional iteration of the FDRSB training signal is based at least in part on an associated channel having a signal-to-noise ratio (SNR) that fails to satisfy a threshold.

Aspect 15: A method of wireless communication performed by a user equipment (UE), comprising: receiving a multi-port frequency dependent residual side band (FDRSB) training signal with the FDRSB signal transmitted via different ports on interleaved subcarriers, reception of the FDRSB comprising receiving the FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers; and transmitting an indication of FDRSB correction that is based at least in part on the FDRSB training signal.

Aspect 16: The method of Aspect 15, further comprising receiving an additional iteration of the FDRSB training signal, wherein the indication of the FDRSB correction is based at least in part on the additional iteration of the FDRSB training signal.

Aspect 17: The method of Aspect 16, wherein reception of the additional iteration of the FDRSB training signal is based at least in part on an associated channel having a signal-to-noise ratio (SNR) that fails to satisfy a threshold.

Aspect 18: The method of any of Aspects 15-17, further comprising: receiving an indication of a configuration of the first set of subcarriers and the second set of subcarriers.

Aspect 19: The method of any of Aspects 15-18, wherein the first set of subcarriers comprises a first subset of subcarriers allocated to a first port of an associated network node, and wherein the first set of subcarriers comprises a second subset of subcarriers allocated to a second port of the associated network node.

Aspect 20: The method of Aspect 19, wherein the first set of subcarriers comprises a third subset of subcarriers allocated to a third port of the associated network node.

Aspect 21: The method of Aspect 20, wherein the third subset of subcarriers are vacant based at least in part on the associated network node being configured to communicate with the UE via the first port and the second port, and being configured not to communicate with the UE via the third port.

Aspect 22: The method of Aspect 19, wherein the indication of FDRSB correction includes a first information element associated with the first port and a second information element associated with the second port.

Aspect 23: The method of any of Aspects 15-22, further comprising one or more of: interpolating FDRSB correction information associated with the first set of subcarriers; or interpolating network node FDRSB correction information associated with the second set of subcarriers.

Aspect 24: The method of any of Aspects 15-23, wherein the indication of the FDRSB correction comprises: information elements associated with individual subcarriers of the first set of subcarriers, or information elements associated with individual subcarriers of the second set of subcarriers.

Aspect 25: The method of any of Aspects 15-24, further comprising: receiving an indication of an allocation for the FDRSB training signal.

Aspect 26: The method of Aspect 25, wherein reception of the indication of the allocation for the FDRSB training signal is based at least in part on one or more of: a change in temperature at the UE, a change in temperature at an associated network node, a precoding change for transmissions by the associated network node, a precoding change for transmissions by the UE, or an age of an update of the FDRSB correction.

Aspect 27: A method of wireless communication performed by a network node, comprising: transmitting a multi-port frequency dependent residual side band (FDRSB) training signal with the FDRSB signal transmitted via different ports on interleaved subcarriers, transmission of the FDRSB comprising transmitting the FDRSB training signal on a first set of subcarriers that are lower than a carrier frequency and on a second set of subcarriers that are higher than the carrier frequency, a mirror of the first set of subcarriers about the carrier frequency being non-overlapping with the second set of subcarriers; and receiving an indication of FDRSB correction that is based at least in part on the FDRSB training signal.

Aspect 28: The method of Aspect 27, further comprising transmitting an additional iteration of the FDRSB training signal, wherein the indication of the FDRSB correction is based at least in part on the additional iteration of the FDRSB training signal.

Aspect 29: The method of Aspect 28, wherein transmission of the additional iteration of the FDRSB training signal is based at least in part on an associated channel having a signal-to-noise ratio (SNR) that fails to satisfy a threshold.

Aspect 30: The method of any of Aspects 27-29, further comprising: transmitting an indication of a configuration of the first set of subcarriers and the second set of subcarriers.

Aspect 31: The method of any of Aspects 27-30, wherein the first set of subcarriers comprises a first subset of subcarriers allocated to a first port of the network node, and wherein the first set of subcarriers comprises a second subset of subcarriers allocated to a second port of the network node.

Aspect 32: The method of Aspect 31, wherein the first set of subcarriers comprises a third subset of subcarriers allocated to a third port of the network node.

Aspect 33: The method of Aspect 32, wherein the third subset of subcarriers are vacant based at least in part on the network node being configured to communicate with a user equipment (UE) via the first port and the second port, and being configured not to communicate with the UE via the third port.

Aspect 34: The method of Aspect 31, wherein the indication of FDRSB correction includes a first information element associated with the first port and a second information element associated with the second port.

Aspect 35: The method of any of Aspects 27-34, wherein the indication of the FDRSB correction comprises: information elements associated with individual subcarriers of the first set of subcarriers, or information elements associated with individual subcarriers of the second set of subcarriers.

Aspect 36: The method of any of Aspects 27-35, further comprising: transmitting an indication of an allocation for the FDRSB training signal.

Aspect 37: The method of Aspect 36, wherein transmission of the indication of the allocation for the FDRSB training signal is based at least in part on one or more of: a change in temperature at a user equipment (UE), a change in temperature at an network node, a precoding change for transmissions by the network node, a precoding change for transmissions by the UE, or an age of an update of the FDRSB correction.

Aspect 38: An apparatus for wireless communication at a device, comprising a processor; memory coupled with the processor; and instructions stored in the memory and executable by the processor to cause the apparatus to perform the method of one or more of Aspects 1-37.

Aspect 39: A device for wireless communication, comprising a memory and one or more processors coupled to the memory, the one or more processors configured to perform the method of one or more of Aspects 1-37.

Aspect 40: An apparatus for wireless communication, comprising at least one means for performing the method of one or more of Aspects 1-37.

Aspect 41: A non-transitory computer-readable medium storing code for wireless communication, the code comprising instructions executable by a processor to perform the method of one or more of Aspects 1-37.

Aspect 42: A non-transitory computer-readable medium storing a set of instructions for wireless communication, the set of instructions comprising one or more instructions that, when executed by one or more processors of a device, cause the device to perform the method of one or more of Aspects 1-37.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a +a+a, a +a+b, a +a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
receive a frequency dependent residual side band (FDRSB) training signal via one or more time resources;
transmit an indication of network node FDRSB correction information that is based at least in part on the FDRSB training signal; and
receive a communication, reception of the communication comprising applying a UE FDRSB correction that is based at least in part on the FDRSB training signal.

2. The UE of claim 1, wherein the one or more processors, to receive the FDRSB training signal via one or more time resources, are configured to:
receive a first portion of the FDRSB training signal via a first time resource and using a first phase shift; and
receive a second portion of the FDRSB training signal via a second time resource and using a second phase shift that is different from the first phase shift.

3. The UE of claim 2, wherein the first phase shift and the second phase shift are out of phase by approximately 90 degrees.

4. The UE of claim 2, wherein the UE FDRSB correction is based at least in part on a difference in measurements of the FDRSB training signal during the first time resource and measurements of the FDRSB training signal during the second time resource.

5. The UE of claim 1, wherein the one or more processors, to receive the FDRSB training signal via one or more time resources, are configured to:
receive a first portion of the FDRSB training signal via a first time resource, the first portion including the FDRSB training signal on a first set of subcarriers that are lower than a carrier frequency and on a second set of subcarriers that are higher than the carrier frequency, wherein a mirror of the first set of subcarriers about the carrier frequency is non-overlapping with the second set of subcarriers.

6. The UE of claim 5, wherein the one or more processors, to receive the FDRSB training signal via one or more time resources, are configured to:
receive a second portion of the FDRSB training signal via a second time resource, the second portion including the FDRSB training signal on a third set of subcarriers that are lower than the carrier frequency and on a fourth set of subcarriers that are higher than the carrier frequency, wherein a mirror of the third set of subcarriers about the carrier frequency is non-overlapping with the fourth set of subcarriers.

7. The UE of claim 6, wherein the mirror of the first set of subcarriers comprises the third set of subcarriers,
wherein a mirror of the second set of subcarriers comprises the fourth set of subcarriers,
wherein the mirror of the third set of subcarriers comprises the first set of subcarriers, or
wherein a mirror of the fourth set of subcarriers comprises the second set of subcarriers.

8. The UE of claim 5, wherein the one or more processors are further configured to one or more of:
interpolating network node FDRSB correction information associated with the first set of subcarriers;
interpolating network node FDRSB correction information associated with the second set of subcarriers;
interpolating UE FDRSB correction information associated with the first set of subcarriers; or interpolating UE FDRSB correction information associated with the second set of subcarriers.

9. The UE of claim 1, wherein the one or more processors are further configured to:
receive an indication of an allocation of the one or more time resources for reception of the FDRSB training signal.

10. The UE of claim 9, wherein reception of the indication of the allocation is based at least in part on one or more of:
a request from the UE,
a change in temperature,
a change in precoding used for communications between the UE and a network node,
a periodicity of the FDRSB training signal, or
an amount of time from a most recent FDRSB training signal.

11. The UE of claim 1, wherein the FDRSB training signal spans a bandwidth that is based at least in part on an operating bandwidth of a network node.

12. The UE of claim 1, wherein the communication has network node FDRSB correction applied based at least in part on the indication of the network node FDRSB correction information.

13. The UE of claim 1, wherein the one or more processors are further configured to receive an additional iteration of the FDRSB training signal,
wherein the indication of the network node FDRSB correction information is based at least in part on the additional iteration of the FDRSB training signal.

14. The UE of claim 13, wherein reception of the additional iteration of the FDRSB training signal is based at least in part on an associated channel having a signal-to-noise ratio (SNR) that fails to satisfy a threshold.

15. A method of wireless communication performed by a user equipment (UE), comprising:
receiving a frequency dependent residual side band (FDRSB) training signal via one or more time resources;
transmitting an indication of network node FDRSB correction information that is based at least in part on the FDRSB training signal; and
receiving a communication, reception of the communication comprising applying a UE FDRSB correction that is based at least in part on the FDRSB training signal.

16. The method of claim 15, wherein receiving the FDRSB training signal via one or more time resources comprises:
receiving a first portion of the FDRSB training signal via a first time resource and using a first phase shift; and
receiving a second portion of the FDRSB training signal via a second time resource and using a second phase shift that is different from the first phase shift.

17. The method of claim 16, wherein the first phase shift and the second phase shift are out of phase by approximately 90 degrees.

18. The method of claim 16, wherein the UE FDRSB correction is based at least in part on a difference in measurements of the FDRSB training signal during the first time resource and measurements of the FDRSB training signal during the second time resource.

19. The method of claim 15, wherein receiving the FDRSB training signal via one or more time resources comprises:
receiving a first portion of the FDRSB training signal via a first time resource, the first portion including the FDRSB training signal on a first set of subcarriers that are lower than a carrier frequency and on a second set of subcarriers that are higher than the carrier frequency, wherein a mirror of the first set of subcarriers about the carrier frequency is non-overlapping with the second set of subcarriers.

20. The method of claim 19, wherein receiving the FDRSB training signal via one or more time resources comprises:
receiving a second portion of the FDRSB training signal via a second time resource, the second portion including the FDRSB training signal on a third set of subcarriers that are lower than the carrier frequency and on a fourth set of subcarriers that are higher than the carrier frequency, wherein a mirror of the third set of subcarriers about the carrier frequency is non-overlapping with the fourth set of subcarriers.

21. The method of claim 20, wherein the mirror of the first set of subcarriers comprises the third set of subcarriers,
wherein a mirror of the second set of subcarriers comprises the fourth set of subcarriers,
wherein the mirror of the third set of subcarriers comprises the first set of subcarriers, or
wherein a mirror of the fourth set of subcarriers comprises the second set of subcarriers.

22. The method of claim 19, further comprising one or more of:
interpolating network node FDRSB correction information associated with the first set of subcarriers;
interpolating network node FDRSB correction information associated with the second set of subcarriers;
interpolating UE FDRSB correction information associated with the first set of subcarriers; or interpolating UE FDRSB correction information associated with the second set of subcarriers.

23. The method of claim 15, further comprising:
receiving an indication of an allocation of the one or more time resources for reception of the FDRSB training signal.

24. The method of claim 23, wherein reception of the indication of the allocation is based at least in part on one or more of:
a request from the UE,
a change in temperature,
a change in precoding used for communications between the UE and a network node, a periodicity of the FDRSB training signal, or an amount of time from a most recent FDRSB training signal.

25. The method of claim 15, wherein the FDRSB training signal spans a bandwidth that is based at least in part on an operating bandwidth of a network node.

26. The method of claim 15, wherein the communication has network node FDRSB correction applied based at least in part on the indication of the network node FDRSB correction information.

27. The method of claim 15, further comprising receiving an additional iteration of the FDRSB training signal,
 wherein the indication of the network node FDRSB correction information is based at least in part on the additional iteration of the FDRSB training signal.

28. The method of claim 27, wherein reception of the additional iteration of the FDRSB training signal is based at least in part on an associated channel having a signal-to-noise ratio (SNR) that fails to satisfy a threshold.

29. A non-transitory computer-readable medium storing a set of instructions for wireless communication, the set of instructions comprising:
 one or more instructions that, when executed by one or more processors of a user equipment (UE), cause the UE to:
 receive a frequency dependent residual side band (FDRSB) training signal via one or more time resources;
 transmit an indication of network node FDRSB correction information that is based at least in part on the FDRSB training signal; and
 receive a communication, reception of the communication comprising applying a UE FDRSB correction that is based at least in part on the FDRSB training signal.

* * * * *